United States Patent [19]
Dolan et al.

[11] Patent Number: 5,883,337
[45] Date of Patent: Mar. 16, 1999

[54] METHODS AND SYSTEMS EMPLOYING STRAIN GAUGE SIGNALS TO DETERMINE THE DYNAMICS OF MOVING RAILCARS

[75] Inventors: Joseph F. Dolan, Philadelphia, Pa.; Daniel G. Niemiec, Canton, Mich.; Lawrence J. Davis, III, Collingswood, N.J.

[73] Assignee: Consolidated Rail Corporation, Philadelphia, Pa.

[21] Appl. No.: 823,814

[22] Filed: Mar. 24, 1997

[51] Int. Cl.[6] ........................................ G01L 1/00
[52] U.S. Cl. ............................. 177/163; 73/1.13; 702/42
[58] Field of Search ............................. 177/163, 132, 177/50; 73/1.13, 1.15; 702/42

[56] References Cited

U.S. PATENT DOCUMENTS

| | | | |
|---|---|---|---|
| 2,930,888 | 3/1960 | Crawford et al. | 246/124 |
| 3,063,635 | 11/1962 | Gordon | 177/163 |
| 3,155,184 | 11/1964 | Raskin | 177/163 |
| 3,276,525 | 10/1966 | Cass | 177/163 |
| 3,439,524 | 4/1969 | Rogers | 73/1.13 |
| 3,446,298 | 5/1969 | Cory et al. | 177/163 |
| 3,545,555 | 12/1970 | Cass | 177/1 |
| 3,670,833 | 6/1972 | Tomohiko et al. | 177/1 |
| 3,679,011 | 7/1972 | Hawver | 177/134 |
| 3,741,327 | 6/1973 | Nordstrom et al. | 177/163 |
| 3,746,111 | 7/1973 | Berthiaume et al. | 177/163 |
| 3,960,228 | 6/1976 | Nordstrom | 177/211 |
| 3,992,922 | 11/1976 | Noble | 73/9 |
| 4,235,403 | 11/1980 | Gillen et al. | 246/182 A |
| 4,416,342 | 11/1983 | Snead | 177/163 |
| 4,560,016 | 12/1985 | Ibanez et al. | 177/132 |
| 4,657,096 | 4/1987 | Angelbeck | 177/163 |
| 4,701,866 | 10/1987 | Harrison et al. | 177/163 |
| 4,712,423 | 12/1987 | Siffert et al. | 73/146 |
| 4,781,060 | 11/1988 | Berndt | 73/146 |
| 4,800,972 | 1/1989 | Snead | 177/163 |
| 4,813,820 | 3/1989 | Cadwell et al. | 408/1 R |
| 4,834,199 | 5/1989 | Bolland | 177/163 |
| 4,956,999 | 9/1990 | Bohannan et al. | 73/587 |
| 5,002,141 | 3/1991 | Losbough et al. | 73/1.13 |
| 5,111,897 | 5/1992 | Snyder et al. | 177/132 |
| 5,129,260 | 7/1992 | Van Der Avoird | 73/122 |
| 5,629,489 | 5/1997 | Hipkiss et al. | 73/862.622 |
| 5,635,679 | 6/1997 | Kohasi et al. | 73/1.13 |

Primary Examiner—Ronald Biegel
Attorney, Agent, or Firm—Woodcock Washburn Kurtz Mackiewicz & Norris LLP

[57] ABSTRACT

The present invention provides a system and method for measuring weight and speed of a moving railcar through dynamic processing of a voltage signal from at least one strain gauge embedded into a rail on the railroad track. The system comprises at least one strain gauge, an amplifier circuit, a converter circuit, and a first processing means. The method performed by the first processing means is a state machine expert system algorithm which dynamically determines the baseline non-stressed voltage level and the peak voltage level upon the strain gauge being stressed by a moving railcar passing over the strain gauge. The method further provides for eliminating the effects of debounce on the weight calculations by continuously monitoring the voltage signal from the strain gauge for a predetermined period of time after an initial peak is detected and updating that value if a greater peak is detected within the predetermined period of time. Other aspects of the present invention include a second processing means which performs fault tolerance and weight calculations based on the baseline voltage level and peak voltage level of each operating strain gauge. The system also provides for transmitting control signals to external braking devices located on the railroad track for improved control in coupling of the moving railcars.

22 Claims, 10 Drawing Sheets

METHODS AND SYSTEMS EMPLOYING STRAIN GAUGE SIGNALS TO DETERMINE THE DYNAMICS OF MOVING RAILCARS

FIELD OF THE INVENTION

The present invention generally relates to systems and methods for determining the dynamic properties of moving railcars. More specifically, the invention relates to the evaluation of signals received from strain gauges to accurately determine weight, speed and direction of moving railcars, primarily for use in railroad distribution yards.

BACKGROUND OF THE INVENTION

Determining the weight and other dynamic properties of railcars is useful, particularly in railroad distribution yards in which railcars are reallocated based on their weight classifications and must be coupled to each other at controlled speeds.

Railroad distribution yards are used to hold railcars awaiting departure and to align the railcars into trains designated for various destinations. The railcar alignment may be based on the destination of the load of the railcar, the necessity for additional railcars on a specific train, the weight capacity of a train's engine, etc. Generally, railcars are classified into one of four weight categories: light, medium, heavy and extra heavy.

The normal operation at a distribution yard includes the use of a "hump track" which, as the name suggests, is a track which runs over a hump, or hill. A railcar is usually backed up the hump and allowed to free roll down the other side on the hump track. The hump track leads to as many as ninety different tracks, called holding or pullout tracks, to which the railcar may be directed. The different tracks are used for the alignment of the railcars into trains designated for certain destinations. For example, track one could be used to couple railcars destined for Chicago, track two for Philadelphia, track three for New York, etc.

In order to control the railcar dispersement at the distribution yard, each of the railcars should be classified. The process of railcar classification usually requires the ability to determine railcar characteristics, such as speed and weight. The proper coupling of the railcars at speeds that will not damage the railcars or their contents is achieved by predicting the rolling behavior of the railcars.

Therefore, it is necessary to utilize both weight and speed measurements to determine if and how much the railcar should be slowed during its free roll down the hump track. There are usually only a few sections of a hump track which contain braking systems, called retarders. The retarders are used to control the speed of the railcar and prevent coupling at excess speeds which could cause damage. Information regarding the weight and speed of the railcar moving down the hump track must therefore be analyzed quickly and accurately and transmitted to the retarder controller in sufficient time to assess the need for and duration of the operation of the track's braking system.

In determining the necessity for reducing the speed of the moving railcar, the retarder control system analyzes the kinetic energy of the railcar according to the following formula:

$$E = \tfrac{1}{2} mv^2$$

Thus, both the weight of the railcar and its speed must be determined precisely. With the calculation of the energy, the reduction in speed necessary to safely couple the railcar with the next railcar on the designated track may be determined.

Currently, distribution yards utilize micro-switch type "slotted" weight rails to weigh railcars. These weight rails contain slots which have been cut into a section of the rails so that the rails flex as railcars pass over them. The amount of flex trips one or more microswitches. The closing (tripping) of the microswitches sends a signal to a computer indicating the weight class (light, medium, heavy or extra heavy) of the railcar. For example, if only one microswitch closes, the railcar is "light," two indicates "medium," etc.

The micro-switch based "slotted" weight rails have many problems associated with installation, accuracy and cost. Because they are based on mechanical flex of the rail, the continuous stressing of the slotted rails usually results in cracking. Failure generally occurs within three months to two years of use. Breakage of the weight rail disrupts the operation of the distribution yard, is dangerous and may result in derailments. Furthermore, it results in shutting down the distribution yard operation until the weight rail can be replaced.

Additionally, the accuracy of the weight rail system is less than ideal. It is difficult to maintain and adjust the weight classification readings. The undersection of the rail is susceptible to changes resulting from ballast movement caused by vibrations. Therefore, the undersection must be kept properly tamped to get consistent readings. Lastly, the weight rail system only classifies the railcars into one of the four weight categories; thus, the weight of the railcars is only determined within about 25,000 pounds. Greater accuracy is needed for improved control of car coupling.

Finally, the average cost of a micro-switch slotted weight rail is about $30,000 for the rail alone. Additional expense is incurred for installation and for system shutdown upon breakage of a weight rail.

While the weight rails are the most commonly used weighing devices in railroad distribution yards, the use of strain gauges for weighing railcars has also been known in the prior art. Strain gauges are used by a number of companies in the railway industry, including Salient Systems, Siemens, Weightronics, and Revere Technologies, to analyze weight of railcars. Strain gauge systems for use in weighing moving railcars have also been disclosed in U.S. Pat. No. 4,416,342, issued to Snead, and U.S. Pat. No. 4,834,199, issued to Bolland. Like the strain gauges utilized by the railway companies listed above, the strain gauge systems described in the Snead and Bolland references calculate weight based solely on the peak voltage of the signals read from the strain gauges. There is no accommodation for fluctuating baseline voltage levels resulting from the effects of temperature variations or lateral stresses on the strain gauges. Furthermore, the references do not describe any means for reducing or eliminating the debounce effects that the moving railcars often have on the strain gauge readings. In general, debounce effects result in a false peak in the strain gauge signal close in time to the actual peak caused by the weight of the moving railcar exerting direct force on the strain gauge. This false peak may result from vibrations on the railroad track caused by a moving railcar, or other external forces. Whatever the cause, the debounce effect could result in inaccurate weight measurements by a weight system utilizing strain gauges. The prior art strain gauge devices, therefore, must function differently than the present invention or must be installed with a different mechanical system to negate the lateral forces. Otherwise, they will lack much needed accuracy in their weight measurements.

SUMMARY OF THE INVENTION

The present invention provides systems and methods for determining weight, speed and direction of a moving railcar through dynamic processing of voltage signals from strain gauges embedded into a section of railroad track. The systems and methods overcome the problems of the prior art systems described above and provide a more accurate, easily maintained and cost effective weighing system.

The systems of the present invention utilize one or more strain gauges embedded into a portion of track. An amplifier circuit is then coupled to each of the: strain gauges and amplifies the signals received from the strain gauges. These amplified signals are converted to digital signals by converter circuits and read by a first processor, typically a high-speed slave central processing unit. The first processor continuously receives the signals from the strain gauges and dynamically determines the baseline voltage level of each of the strain gauges. The first processor also continuously searches each of the signals from the strain gauges for a rise in the voltage level at or above a predetermined rate (preferably 12,000 pounds per 40 milliseconds) indicative of an approaching railcar. Once that rise has been detected, the first processor dynamically determines the peak voltage obtained within a predetermined period of time. By continuing to search for the peak voltage level within the predetermined period of time, the system reduces the possibility that a debounce signal peak will be improperly interpreted as the peak resulting from the strain of the railcar passing directly over the embedded strain gauge.

In preferred embodiments, four strain gauges are utilized, two on each rail of the track. The strain gauges are positioned such that the wheels on any axle of a moving railcar will pass over two strain gauges, one on each of the parallel rails, practically simultaneously. This reduces the effect of rocking on the average weight reading calculated by the system. Furthermore, the two strain gauges on a given rail are spaced a known distance apart, two feet in one preferred embodiment, so that speed can be calculated based on the time between the peak readings of the two strain gauges on the same rail. The preferred system also contains a second processor for receiving the baseline and differential voltage levels from the first processor and calculating the resulting weight reading for each of the strain gauges and an average weight based on the readings from all of the operating strain gauges. Preferred embodiments also provide for surge protection, noise reduction and signal conditioning of the voltage signals emitted by the strain gauges.

The methods of the present invention require embedding at least one strain gauge into a section of railroad track. The methods further provide for analyzing the signals from the at least one strain gauge and dynamically determining the baseline voltage level and the peak voltage level for each strain gauge. This signal analysis is performed by the first processor which is programmed with an expert system state machine algorithm for wave analysis. The first processor continuously performs the preprogrammed algorithm which implements the state logic. In the first state, the first processor continuously updates the baseline voltage level of each of the strain gauges to reflect the minimum voltage level emitted from the strain gauge when no stress is being applied. This continues until a voltage rise above a predetermined amount (preferably 12,000 lbs./40 msec.) is seen. At that point, the first processor stores the lowest baseline value and the state changes. In the second state, the first processor detects and stores a peak voltage level. The peak voltage level is continually updated to reflect the maximum voltage emitted from the strain gauge until a voltage drop of more than a predetermined amount is detected. In one preferred embodiment, the predetermined voltage drop chosen is 12,000 pounds below the peak voltage level. At that point, the state changes again. In this third state, the first processor dynamically assesses the voltage level from the strain gauge for a subsequent predetermined period of time to determine if a value greater than the peak voltage level is obtained. If a new higher voltage signal is emitted by the strain gauge within this predetermined period of time, the previous peak was not actually the result of the moving railcar passing directly over the strain gauge, but was probably a debounce signal. If a new greater value is found, the peak voltage level is again updated to indicate the new value and the first processor reverts to the second state to again monitor the signal for a new peak voltage level. If the voltage from the strain gauge never exceeds the peak voltage level, within the predetermined period of time, the peak voltage level was the result of a moving railcar passing directly over the strain gauge. During the third state, the method also provides for assessing the waveform for a voltage lower than the previously recorded baseline voltage level. If a lower voltage is detected, the baseline voltage level is updated to reflect the new lower value. Otherwise, the baseline voltage level previously stored is maintained. Finally, when the first processor is in the third state and the predetermined period of time expires, the state changes once again. In the fourth state, the first processor reports the baseline voltage level and the voltage differential (the peak minus the baseline) for the strain gauge being analyzed to a second processor. In a preferred embodiment, the predetermined period for monitoring debounce is about 250 milliseconds for railcars moving at speeds from 1 to 14 miles per hour. The second processor has more time to process information and can, therefore, calculate actual weight, determine speed by analyzing the difference between the time that the peak voltage level was detected by the two strain gauges on a given rail, detect problems with certain strain gauges, determine the minimum and maximum readings from the strain gauges, and accumulate various statistics relating to the operation of the system.

The advantages obtained by the present invention include lower cost, heightened accuracy, fault tolerance and fewer failures. First, a strain gauge system as used in the present invention generally costs less than $5,000, as opposed to the $30,000 weight rail. Furthermore, once the system has been initially installed, the replacement of any malfunctioning strain gauge does not require that the distribution yard operation be shutdown or even interrupted. Even if an amplifier circuit or converter circuit breaks down, only the defective component will need to be replaced. Furthermore, the accuracy of the present invention is much greater than those in the prior art. Because of the dynamic baseline and peak determinations, the weight calculations of the present invention are generally within 3,000 pounds of the actual weight of the moving railcar, as opposed to the 25,000 pound margin of error of the weight rail systems. The weight readings of the present invention may, furthermore, be adjusted to increase the accuracy of the present invention. By utilizing the system to measure a railcar with a known weight, the gain of the amplifier circuits may be adjusted so that each of the strain gauges reflects the known weight precisely. Moreover, the system is fault tolerant such that partial failures (for example, damage to one of the strain gauges) will not make the system inoperable. Although partial failure may result in less accuracy, the system will continue to operate and will still be at least as accurate as the systems in the prior art. Finally, while the failure rate of the systems and methods of the present invention are not currently known, any failure will not result in damage to the railroad track or derailment of the moving railcar. Thus, the present invention is also safer than the prior art weight rail systems.

BRIEF DESCRIPTION OF THE DRAWINGS

A full understanding of the invention can be gained from the following description of preferred embodiments when read in conjunction with the accompanying drawings in which.

DETAILED DESCRIPTION OF PREFERRED EMBODIMENTS

Systems and methods which fulfill the abovementioned needs and provide other beneficial features in accordance with the present invention are described below with reference to the figures. Those skilled in the art will readily appreciate that the description given herein with respect to the figures is for explanatory purposes only and is not intended in any way to limit the scope of the invention thereto. Also, common reference numbers are used throughout the figures to represent common elements.

Figure 1:
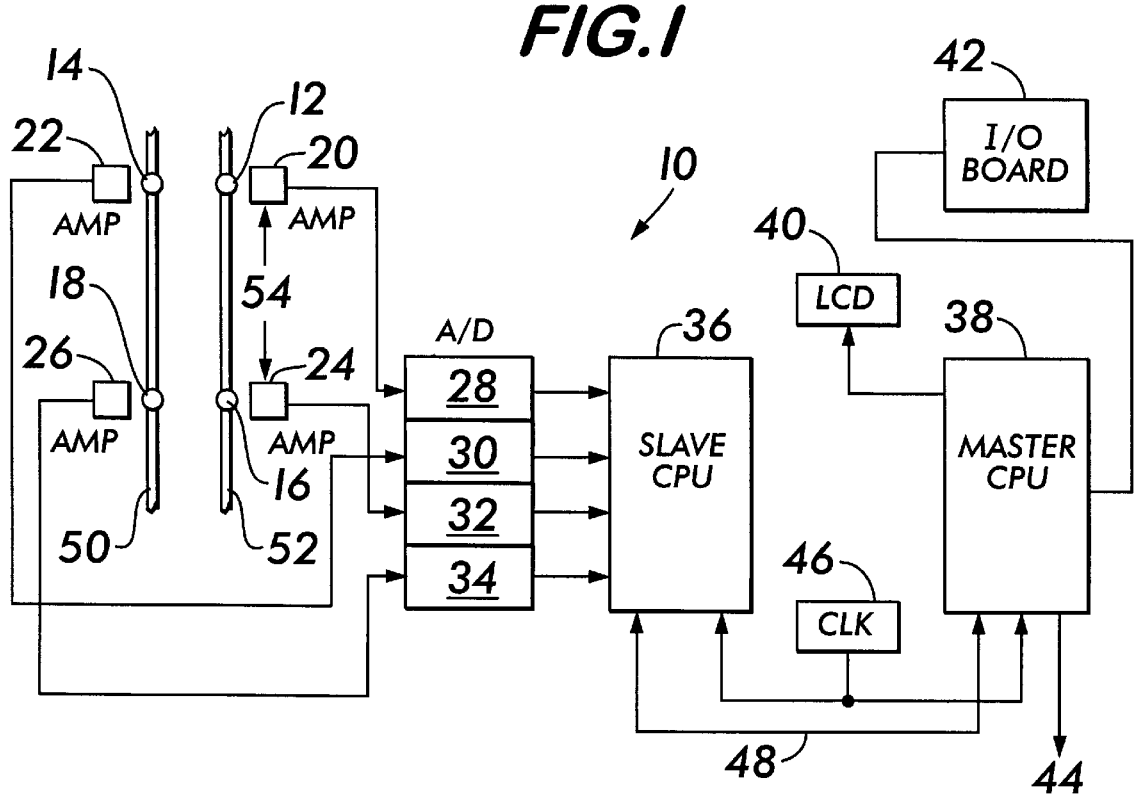
FIG. 1 is a block diagram of a preferred embodiment of the system of the present invention.

Referring now to the figures, FIG. 1 shows a high-level schematic diagram of a preferred embodiment of the system 10 of the present invention. The system 10 comprises four strain gauges 12, 14, 16, 18 embedded into two parallel rails 50, 52 on a section of railroad track. The strain gauges 12, 14, 16, 18 are embedded into the rails by drilling precision ¾" holes into the rails by a method known to those skilled in the art and described in U.S. Pat. No 4,813,820, issued to Cadwell, et al., incorporated herein by. reference. Once the holes are drilled into the rails 50, 52, replacement strain gauges may be easily inserted into the same holes if a strain gauge malfunctions.

Strain gauges are well known to those skilled in the art and are commercially available from many sources. The strain gauges used in one preferred embodiment of the present invention are the GZ-10 (GOZINTA) strain gauges and will be described more fully below in connection with FIG. 2. In general, a strain gauge is a device whose resistance varies with either tension or compression. The amount of variation in the resistance is proportional to the amount of stress applied to the strain gauge because any deflection will cause a reduction in resistance. Therefore, in the present invention, the force of a moving railcar riding on the rail in which a strain gauge is embedded will cause the pressure on the rail (from an axle being above it) to be transferred to the strain gauge. This will cause a reduction in the resistance of the strain gauge. Any movement, or deflection, of the strain gauge in the hole will not materially affect its operation. Thus, a load or weight on the rail will appear as a deflection of voltage in the signal from the strain gauge. The wave pattern produced by an axle crossing over the strain gauge has an amplitude proportional to the weight of the railcar.

Referring again to the diagram in FIG. 1, strain gauges 12, 14, 16, 18 are electrically connected to amplifier circuits 20, 22, 24, 26, respectively. The signal from any given strain gauge, which varies with the pressure on the rail as described above, is constantly transmitted to the corresponding amplifier circuit. The normal differential signals produced by the GZ-10 strain gauges are very small (about $3/10$ of a millivolt, full scale). Therefore, the signals should be amplified for the subsequent analysis to be performed. The corresponding amplifier circuits 20, 22, 24, 26 amplify the signals by a predetermined amount, preferably between 1800 and 2000 times the original strain gauge output voltages. An example of a preferred amplifier circuit for use in the present invention is shown in FIG. 3.

In preferred embodiments, the amplifier circuits 20, 22, 24, 26, as well as amplifying the signals from the strain gauges 12, 14, 16, 18, contain other signal filtering elements which act to reduce noise in the signal and protect the components of the system 10 from voltage surges. Because the differential signals produced by the strain gauges are so small, the noise field in which the signals operate can be much greater than the differential voltage signals themselves. The amplifier circuits, therefore, separate the signals from the noise (preferably using differential inputs). In preferred embodiments, the amplifier circuits are no more than about 15 feet from the corresponding strain gauges. In fact, in practice, the amplifier circuits are usually mounted on the rails in junction boxes which protect both the amplifier circuits and the strain gauges from mechanical injury.

Figure 3A:
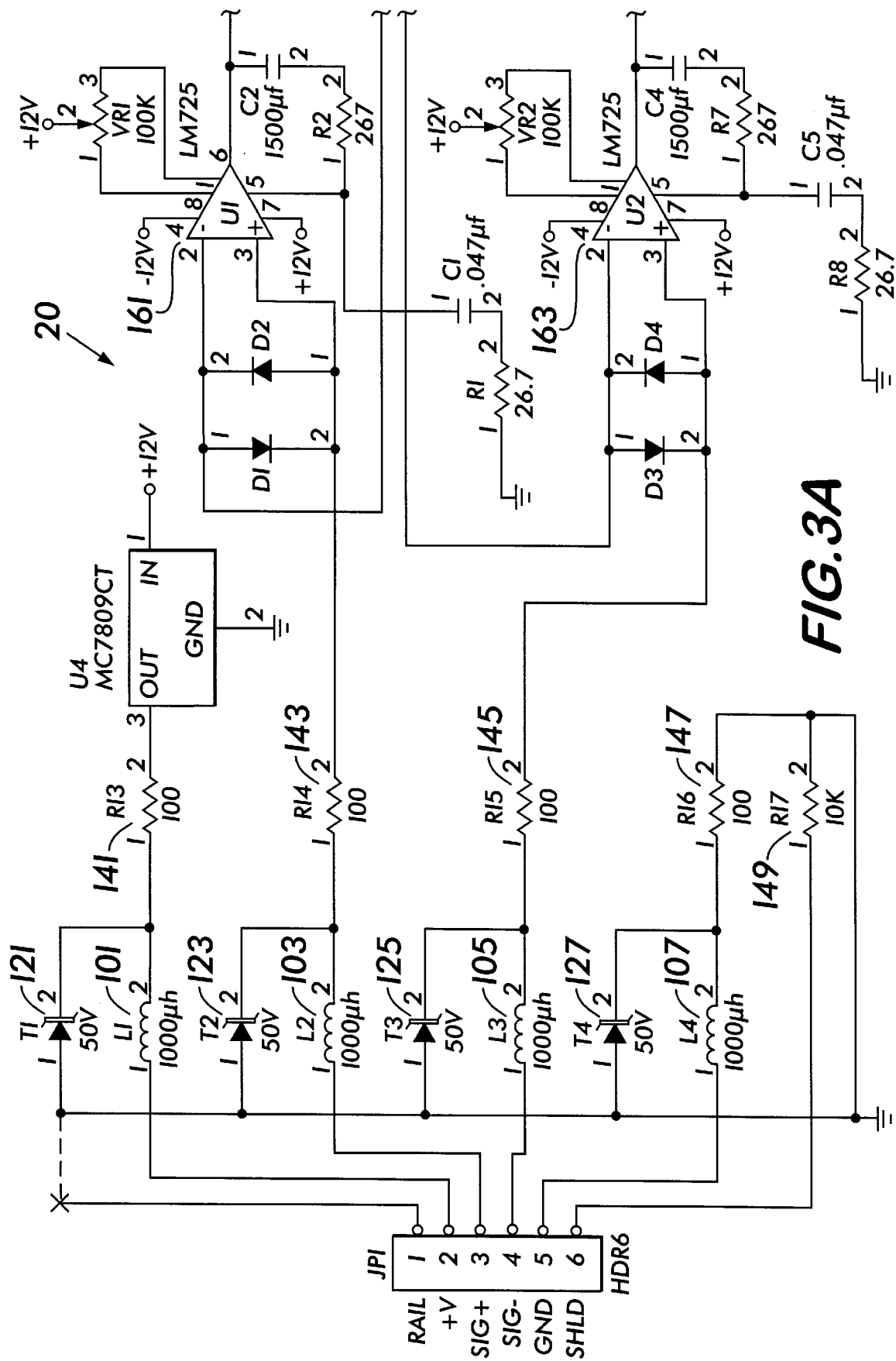
FIGS. 3A and 3B shows a more detailed diagram of the amplifier circuit used in a preferred embodiment of the system of the present invention.
Figure 3B:
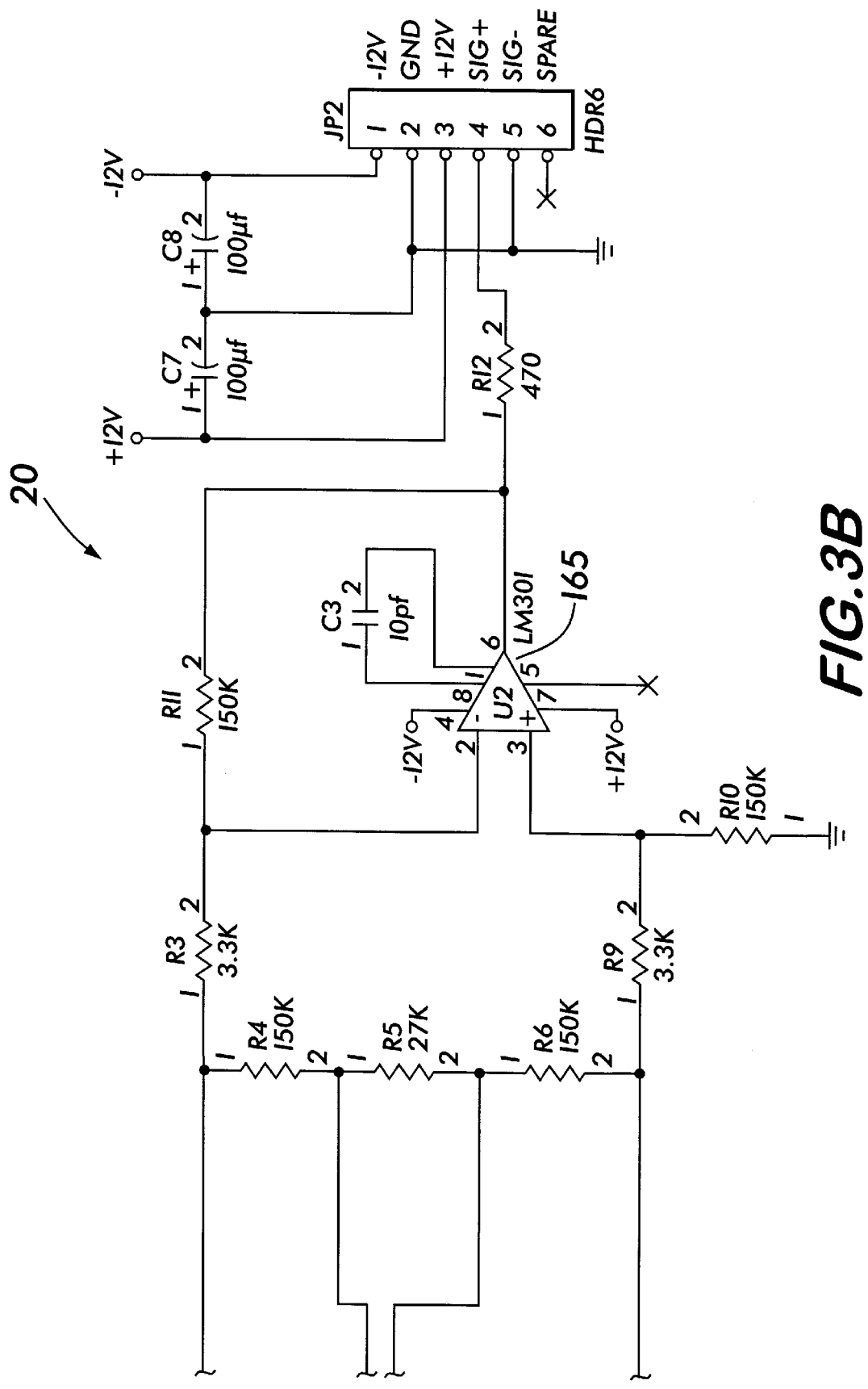

Again in preferred embodiments, each amplifier circuit also contains inductors and zener diodes for lightning and surge protection. As shown in FIGS. 3A and 3B, a preferred amplifier board has a group of four 10 millihenry inductors 101, 103, 105, 107 used for lightning protection. These inductors oppose any rapid change in current over a short time, i.e. surges. Immediately following the inductors are four Sidak bi-directional zener diodes 121, 123, 125, 127. These are also for lightning and surge protection. The function of the zener diodes is to limit the peak voltages to less than 36 volts, and thus to protect the actual amplifiers and the subsequent electrical components of the system 10 of the present invention. Next, the amplifier circuit contains several passive resistors 141, 143, 145, 147, 149 to provide more limiting of surges. Together these elements protect the strain gauges and the amplifier itself from surges and lightning. The breakover voltage of the GZ-10's is only 50 volts; thus, the surge protection prevents current surges from passing through the amplifier as the path of least resistance.

Finally, after the signal passes through the lightning protection, it is presented to two instrumentation operational amplifiers 161, 163. These are set up as emitter followers and provide a high impedance input. The outputs from both operational amplifiers (op amps) are balanced and fed to a third op amp 165 which drives the output of the amplifier circuit. This is a standard instrumentation circuit and the gain is computed by multiplying the gains in the first two op amps with the gain in the final op amp. The circuit is very sensitive, so the resistors are fixed (not variable) and, therefore, the gain is also fixed. While a preferred embodiment of the amplifier circuit for use in the system of the present invention is provided in FIGS. 3A and 3B, any amplifier circuit which can amplify the voltage signal output from the strain gauges will satisfy the requirements of the system of the present invention.

Returning again to the diagram in FIG. 1, once the signals from the strain gauges have been filtered and amplified, they are transmitted, continuously, to corresponding analog-to-digital (A/D) converter circuits 28, 30, 32, 34. The A/D converter circuits 28, 30, 32, 34 convert the signals to corresponding digital signals for further processing by a digital signal processor, here a slave central processing unit (slave CPU) 36. In preferred embodiments, the A/D converter circuits 28, 30, 32, 34 also act to further condition the signals. In general, the amplified signal enters the A/D converter at about one volt. There are four levels of conditioning performed by the converter circuit, differential conditioning, frequency conditioning, amplification adjustment and DC compensation.

The differential conditioning provides noise immunity similar to the amplifier circuit. Any noise that crosses both the reference and the signal will be eliminated. The frequency conditioning is provided by a low pass filter with a slow fall off that has a break frequency of 1 kHz. Therefore, pulses whose period is less than about 1 millisecond will be attenuated. RF noise, EMI kicks and lightning all have periods in the range of microseconds and will, therefore, be significantly reduced. Finally, the amplification adjustment, which also provides DC compensation, allows technicians to vary the DC offset, or baseline, and the span, or gain, of the signals from the strain gauges. The DC offset is the voltage that the source is being compared with, or, in other words, the baseline voltage of a strain gauge embedded in a rail. The most important aspect of the baseline adjustment is to ensure that the strain gauge signal does not fall outside the operating capacity of the A/D converter, typically between +10 volts and −10 volts. Therefore, errors which could result from the signal being clipped can be eliminated. While the normal setting for the DC component in an A/D converter is 0 volts, to avoid clipping of the signals produced by extra heavy railcars, the DC setting in the present invention is preferably slightly lower. In one preferred embodiment, the DC setting is about =2 volts. The gain, or span, adjustment is more difficult. In a preferred embodiment, the span adjustment is set by testing the reading of the strain gauges with a known weight, for example an empty railcar. Typically, the voltage gain used in the present invention is approximately 40,000 pounds per volt.

Finally, the conditioned signal is transmitted to the A/D converter. In one preferred embodiment, an Analog Device AD574A chip is used. This is a 12 bit resolution chip that uses the successive approximation technique for A/D conversion. The conversion time is about 20 microseconds. However, in the operation of the present invention, the converter is set to perform a conversion only once every 1 millisecond. Therefore, as will be obvious to those skilled in the art, any other analog-to-digital converter with the speed and timing capabilities to convert a signal every 1 millisecond. may be used in keeping with the present invention. Again, as shown in FIG. 1, there is one A/D converter 28, 30, 32, 34 for each strain gauge 12, 14, 16, 18 used by the system, or a total of four in a preferred embodiment.

Returning again to the system diagram of FIG. 1, as the signals from the strain gauges are converted into digital signals by the A/D converters, the converted signals are made available to a first processor, or slave CPU 36. The slave CPU 36 used in a preferred embodiment of the present invention is a ZWORLD processor. However, again, as those skilled in the art will know, any processor with similar speed and processing capabilities may be substituted and is within the ambit of the present invention. The slave CPU 36 runs a fast wave analysis routine on all four of the A/D samples every 1 millisecond. A more detailed description of the algorithm performed by the slave CPU 36 is given below in conjunction with the flowchart of FIG. 8. In general, the slave CPU 36 operates as a finite state machine that computes the current baseline voltage and the peak of a pulse from each of the strain gauges. It checks the characteristics of the wave for a dv/dt rise time, minimum pulse width, maximum pulse width, and debounces the wave for a validity period. If all the characteristics are within the specifications and the debounce time has expired for any of the strain gauges, then the differential (peak minus baseline) and baseline values for that particular strain gauge are sent to a second processor, the master CPU 38, as a single weight sample. One set of weight sample values are transmitted for each A/D converter 28, 30, 32, 34, and therefore for each strain gauge 12, 14, 16, 18, for each axle hit. An axle hit is the wave, or signal, resulting from a wheel of an axle passing directly over a strain gauge, thus exerting the maximum force resulting from its weight upon the strain gauge. In normal operation of the system of the present invention, a message of 14 characters will be transmitted from the slave CPU 36 to the master CPU 38 for each crossing of an axle over a strain gauge. Therefore, four messages per axle and eight messages per railcar will usually be transmitted.

Figure 9A:
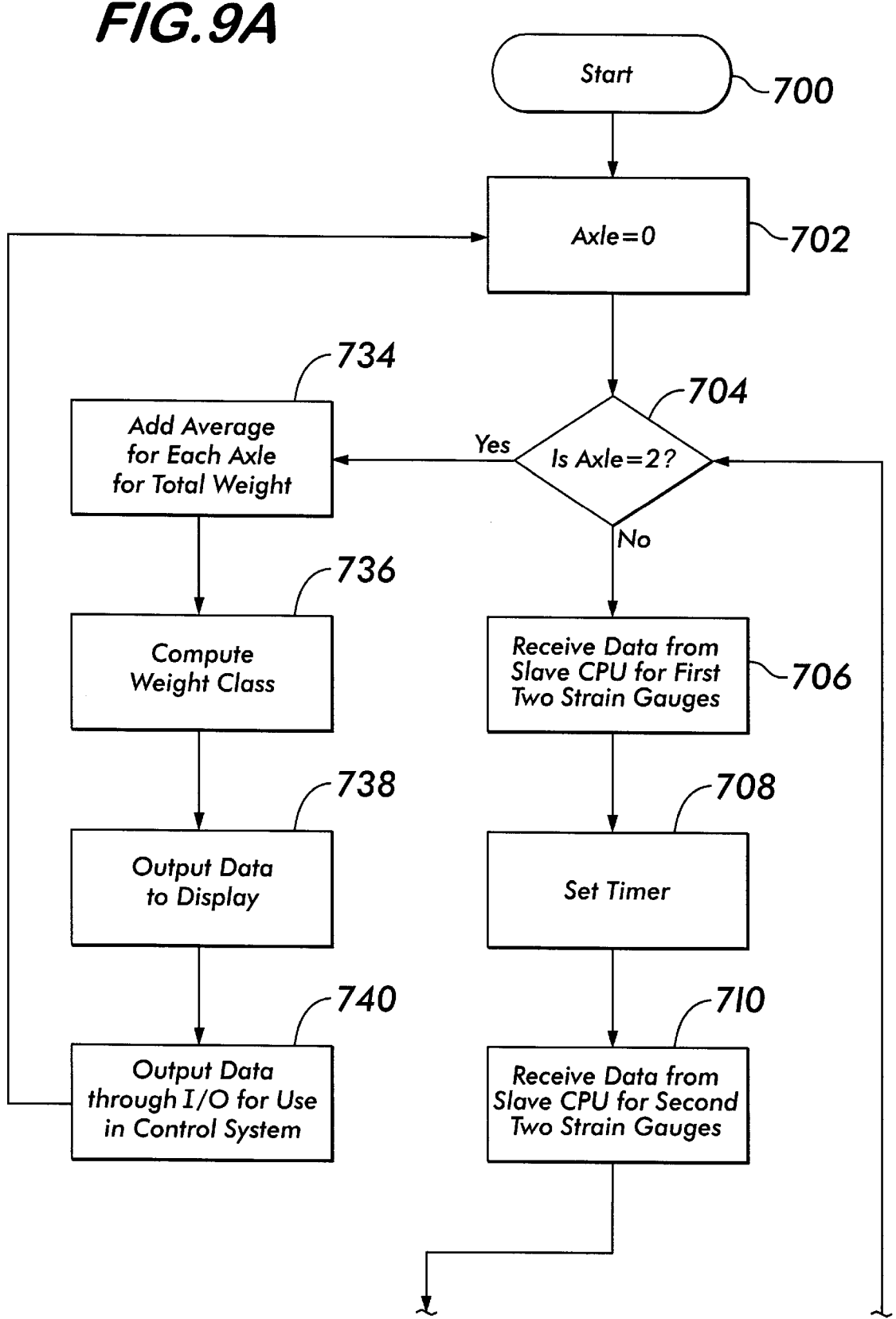
FIGS. 9–9C are a high level flowchart demonstrating the steps of the method performed by the second processor, or master CPU, of a preferred embodiment of the present invention.
Figure 9B:
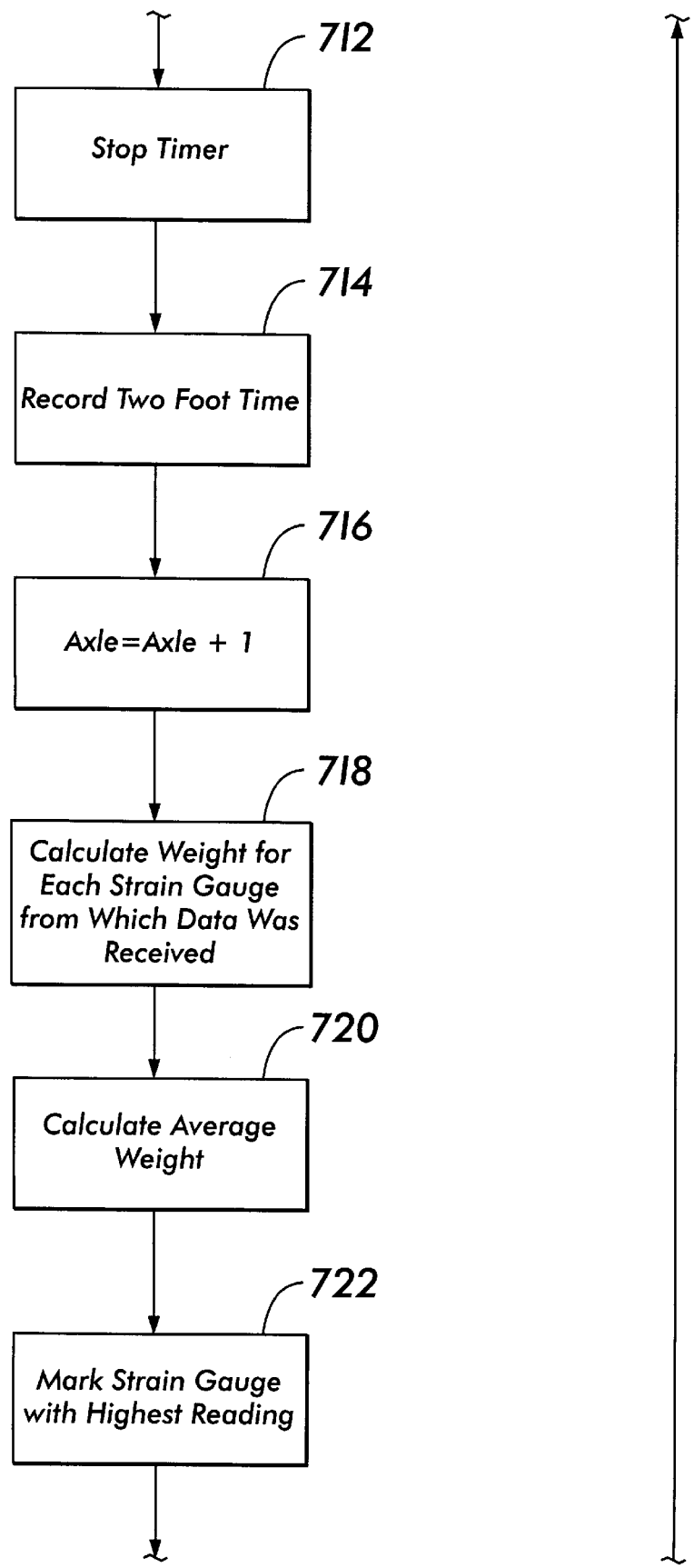
Figure 9C:
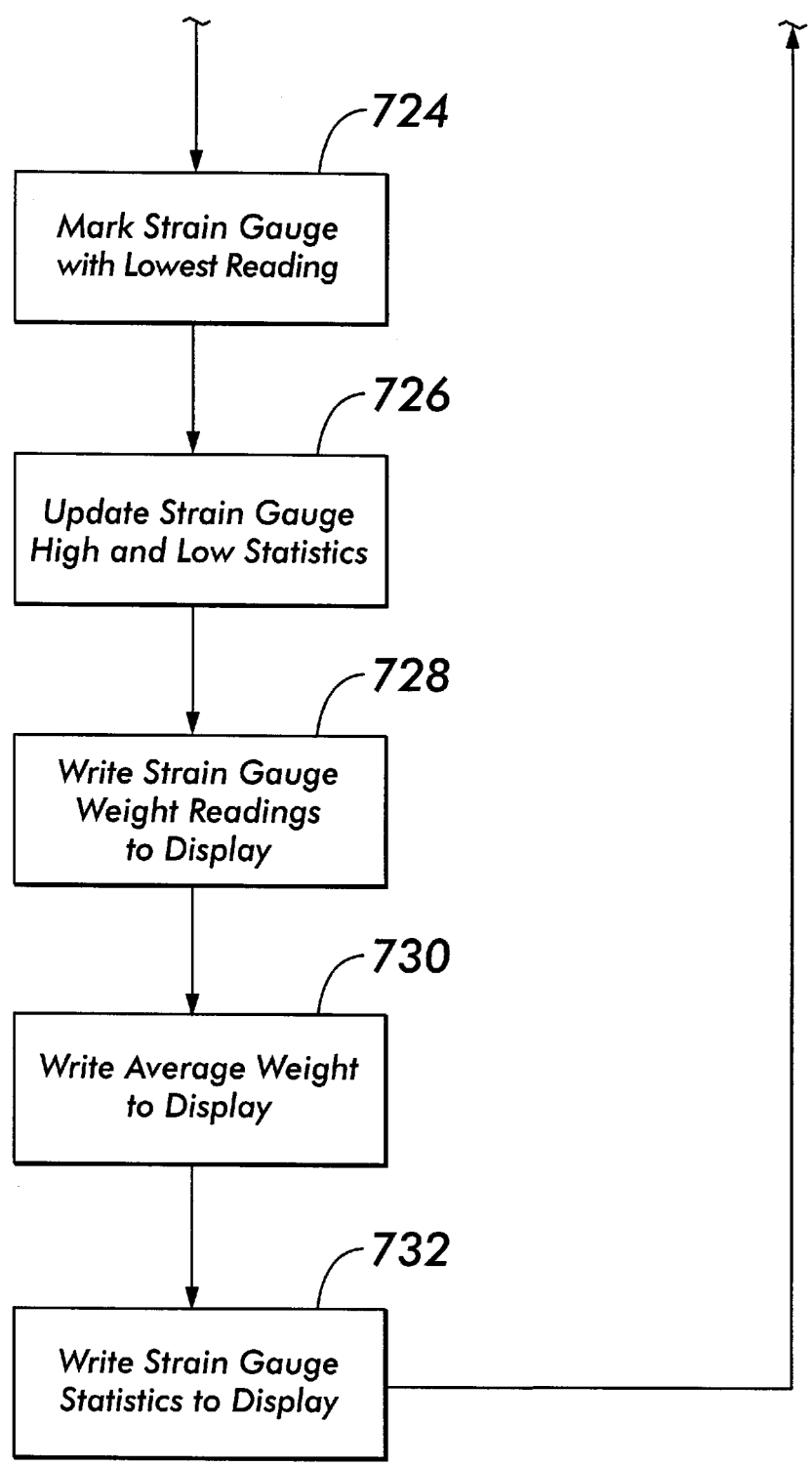

Finally, this information is processed by the second processor, here the master CPU 38. The master CPU 38 performs a preprogrammed algorithm which allows it to access more information from the results transmitted by the slave CPU 36. For example, the master CPU 38 can perform speed analysis, determine an average weight of one railcar based on the readings from all of the operational strain gauges, update statistics on the strain gauge operations (high or low readings), and even provide fault tolerance by determining if one or more of the strain gauges are inoperative. A high-level flowchart of the algorithm performed by the master CPU 38 is shown in FIG. 9. The algorithm will be described in more detail below in connection with that figure.

Figure 4:
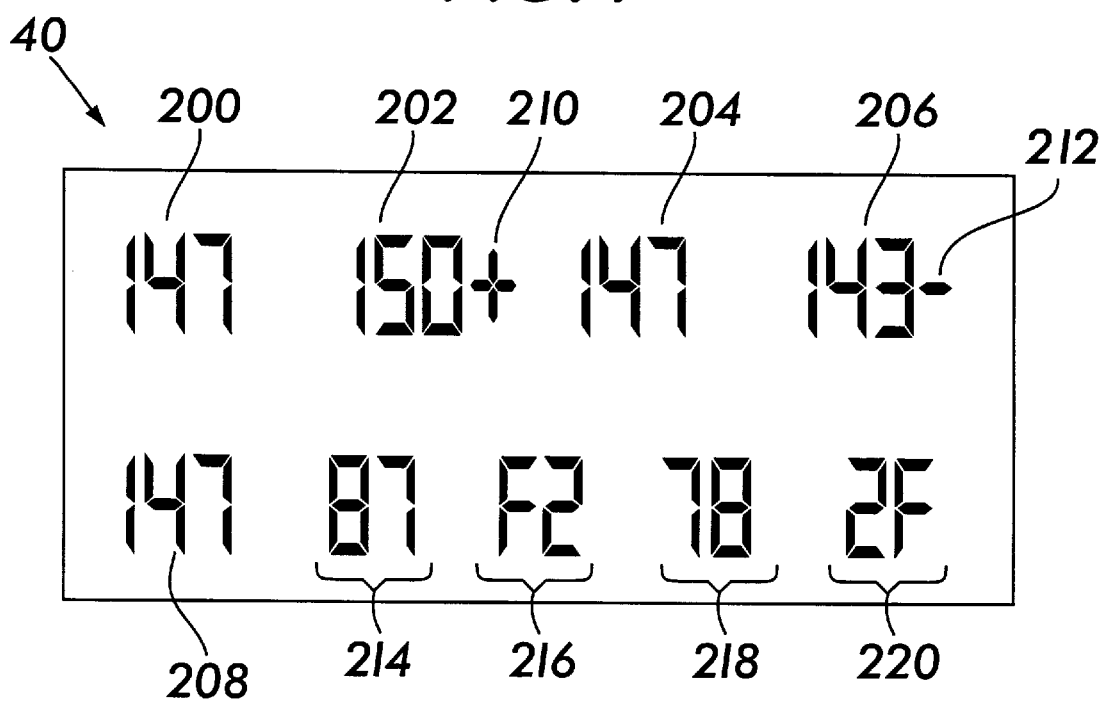
FIG. 4 shows a preferred embodiment of a display for use in the present invention.

Finally, after the data regarding each railcar is compiled by the master CPU 38, it is transmitted to a display 40, to a control system via an I/O board 42 for use in controlling the braking system on the rails and/or to an external device 44 for storage. The preferred display 40 is an LCD. As shown in FIG. 4, the LCD can indicate the weight reading from each strain gauge, the average of the operating strain gauges as the weight reading for an axle, and various statistical information about the strain gauges as will be described more fully below in connection with FIG. 4. In addition, the data calculated by the master CPU 38 may be transmitted to an external source 44, such as a PC or other computer, through any acceptable communication means as will be understood by those skilled in the art. The data may be stored for more in-depth analysis or simply for a record. Finally, the calculated data may be transmitted to an Input-Output Board (I/O Board) 42 for subsequent analysis and for use in controlling the track retarders. The track retarder system is outside the scope of the present invention. However, it will be understood by those skilled in the art that the weight and speed values determined by the system of the present invention can be analyzed in order to determine if and for how long the retarders should be operated to optimize car coupling.

Figure 2:
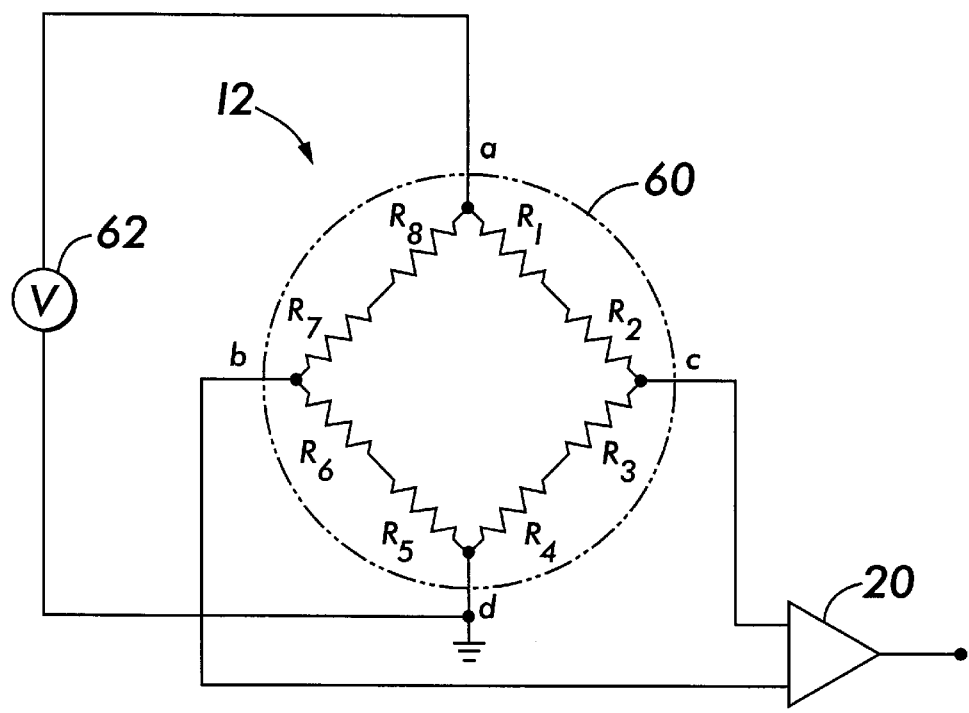
FIG. 2 is a circuit diagram of a typical strain gauge configuration for use in the present invention.

Referring now to FIG. 2, the strain gauge 12 used in one preferred embodiment of the present invention is shown in more detail. As shown, the strain gauge 12 comprises eight resistors $R_1$–$R_8$ arranged in four groups of two series resistors and placed in a conventional bridge configuration. In the GZ-10 strain gauge, the resistors are each 350 ohms, fixed. An excitation voltage 62 supplies the energy to the strain gauge 12. In one preferred embodiment of the present invention, the voltage supply 62 for each strain gauge is nine volts and is derived from a 12 volt power supply which provides energy to the A/D converters 28, 30, 32, 34. The A/D converters 28, 30, 32, 34 are supplied by positive 12 volts, common, negative 12 volts, signal and reference wires. In a preferred embodiment, the positive 12 volt signal also feeds power to a 7809 three terminal regulator used to feed the excitation power to the strain gauges 12, 14, 16, 18. The nine volt excitation feeds the positive input of the strain gauge 12 at the reference point labeled "a" while the common is used as the negative feed, or ground, at reference point The strain gauge 12 can be tested by placing an ohm meter, or multimeter, at any two of the four reference points, "a", "b", "c", or "d". The ohm meter should read as follows when the strain gauge 12 is operational:
a–b=510 ohms
b–c=700 ohms
a–c=510 ohms
b–d=510 ohms
a–d=700 ohms
c–d=510 ohms
The shield 60 to any reference point should be open. This test can be performed on the strain gauge 12 either while embedded in the rail or while outside the rail, with basically identical results. However, the strain gauge 12 must be disconnected from the circuit, and thus the voltage source 62, prior to testing.

Finally, the two reference points labeled "b" and "c" which are not connected to the voltage source provide the differential input signal for use in the wave analysis. Those two reference points are therefore connected directly to the amplifier circuit 20, as shown in FIG. 2.

Referring now to FIG. 4, the LCD 40 for displaying the output from the master CPU 38 is shown in more detail. In one preferred embodiment of the present invention, as discussed above, four strain gauges 12, 14, 16, 18 are embedded in a section of track in order to accommodate the rocking motions of the moving railcar and to more accurately determine the weight of the moving railcar. The LCD 40, therefore, provides information regarding the measurements 200, 202, 204, 206 obtained from each of the individual strain gauges. It also provides an average weight reading 208 and statistics regarding the individual strain gauges, like the highest 210 and lowest 212 readings obtained. Each of the weight values 200, 202, 204, 206, 208 displayed by the LCD 40 are given in thousands of pounds. For example, a reading of 147 on the LCD 40 represents 147,000 pounds. The highest weight reading by the strain gauges will be indicated by a "+"symbol next to that strain gauge's weight reading, while the lowest reading will be indicated by a "–" symbol, as shown in FIG. 4. These indications may be used in determining if the amplification for any of the strain gauges needs to be adjusted.

In order to obtain the average weight value 208 for a single axle of the moving railcar, the master CPU 38 adds together all of the valid readings from the individual strain gauges 12, 14, 16, 18 and divides this number by the number of valid readings. If all of the strain gauges are operating properly, then four valid readings are averaged. However, even if two of the strain gauges are malfunctioning for some reason, the system of the present invention will still display an average weight for the railcar axle based on the valid readings from the operational strain gauges. Thus, even if only two of the strain gauges is operating properly, the average weight value will be displayed. The system and method of the present invention, therefore is fault tolerant and does not require system shutdown or repair every time a strain gauge malfunctions. With fewer operating strain gauges, the average weight value obtained may be less accurate because the effects of the motion of the moving railcar (rocking and swaying) are not reduced or eliminated, as they are with more strain gauge readings. However, the system remains operable and still provides results which are at least as accurate as the weight rail system of the prior art.

Finally, on the bottom line of the LCD 40 are spaces for statistical information pertaining to each of the strain gauges 12, 14, 16, 18 used in the system. For each strain gauge 12, 14, 16, 18, a two digit number 214, 216, 218, 220 is displayed on the LCD 40, wherein the first digit of each of the numbers represents the number of times, in hexadecimal, that the corresponding strain gauge provided the highest weight reading and the second digit represents the number of times, again in hexadecimal, that the corresponding strain gauge provided the lowest weight reading. Again, this information may be helpful in determining whether the amplification on any of the strain gauges should be adjusted. When any of the strain gauges provided the highest or lowest value more than fifteen times (hexadecimal "F"), all of the counters are reset to zero, for continuity.

The display on the LCD 40 generally represents the reading corresponding to the passing of one axle over the strain gauges 12, 14, 16, 18. The second axle will pass in a very short time thereafter and the LCD 40 will then display the values corresponding to the weight readings of the second axle. This is generally not problematic since the information relating to the first and second axle is not usually significantly different. Furthermore, because of the delay, when using the hump track, between moving railcars passing over the strain gauges, the second axle's weight reading will remain present on the LCD 40 for a sufficient length of time for technicians to evaluate it.

Figure 5:
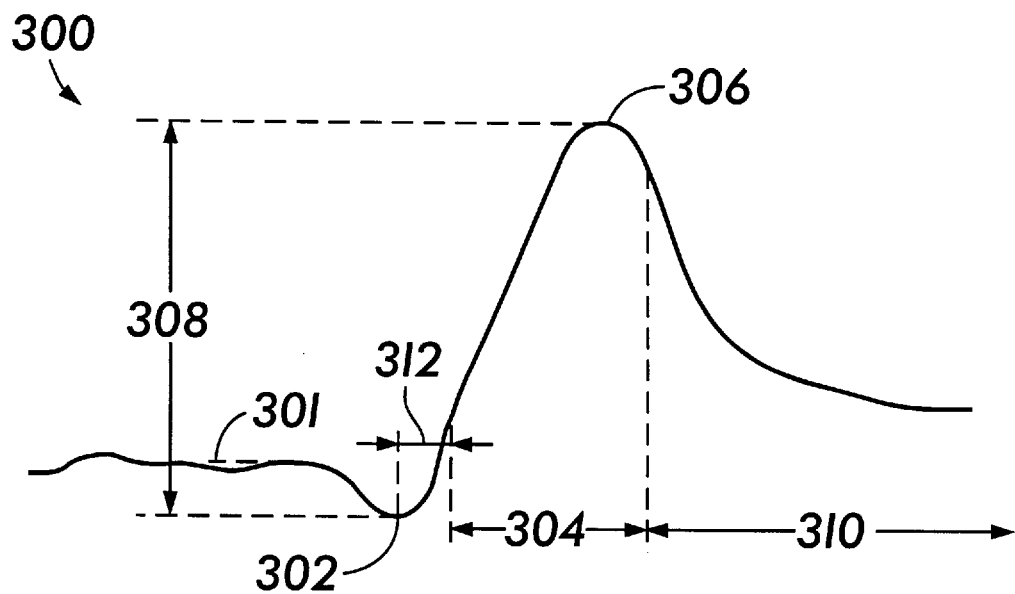
FIGS. 5 and 6 show typical waves representative of the analog voltage signal resulting from a railcar passing over a strain gauge embedded into a portion of track.

It will be helpful to the explanation of the algorithms implemented by the first and second processing means of the present system to describe a few typical waveforms resulting from a moving railcar passing over an embedded strain gauge. Referring now to FIG. 5, a typical waveform 300 resulting from a moving railcar passing over a strain gauge is shown. It should be noted that before the exertion of the force on the strain gauge, the baseline waveform 301 is not completely constant. There are many variations in the baseline waveform 301 which are not the result of a direct pressure from an overhead force, such as the weight of a railcar. The baseline waveform 301 may, moreover, fluctuate dramatically with a rise or fall in temperature. Temperature variations may cause the rails to contract or expand, thereby effecting the pressure exerted upon the embedded strain gauge and, thus, the non-stressed baseline voltage level. Other forces, such as retarder activity and vibrations caused by railcar movements, may also cause the baseline level to vary.

Therefore, it is important to an accurate weight measurement to determine the actual baseline voltage level which must be compared with the peak voltage level resulting from a moving railcar exerting direct pressure on an embedded strain gauge. The systems and methods of the present invention dynamically adjust the baseline voltage level to reflect the actual minimum voltage of the signal produced by the strain gauge when a load is not exerting force upon the strain gauge. Referring again to FIG. 5, the system and method continuously monitors the baseline 301 and updates the baseline voltage level each time a new minimum voltage is obtained. Therefore, in the waveform shown in FIG. 5, the baseline voltage level will be continuously adjusted until the lowest voltage 302 is detected. The lowest voltage 302 will then be recorded as the baseline voltage level for use in the subsequent weight determination. The baseline voltage level continues to be updated until a predetermined rise time is detected. In one preferred embodiment, as discussed above, the predetermined rise time chosen is a 12,000 pound increase within a 40 millisecond period. This rise time has been chosen because it indicates that a railcar "hit", or voltage peak, is likely in the near future. In FIG. 5, the predetermined rise time 312 is detected immediately after the baseline voltage level 302 has been reached. Once the predetermined rise time has been detected, the system and method continuously update the peak voltage value for the strain gauge if a higher voltage level is obtained. In FIG. 5, the peak voltage value would be recorded as the value of the waveform at the point labeled "306." Once the voltage level falls a predetermined amount below the peak voltage value (preferably 12,000 pounds below the peak voltage value), the system monitors for "debounce." In FIG. 5, the debounce state is in region 310. In debounce, the systems and methods continue to monitor for a new peak voltage greater than the peak voltage value previously stored. If a new peak voltage is detected, this indicates that the peak voltage value was not the result of a direct hit by a railcar. An example of a peak resulting from debounce effects is shown in the waveform in FIG. 6. In that case, the peak voltage value is updated to reflect the new peak value obtained. If, on the other hand, no voltage level above the peak voltage value is detected during the debounce period, the peak voltage value recorded is retained as the actual peak value. Then, both the peak value and the baseline value are recorded. The weight measured by the particular strain gauge is determined by finding the voltage differential 308 between the peak voltage value and the baseline voltage and multiplying that value by a predetermined pound to voltage ratio. In one preferred embodiment, each volt represents 40,000 pounds. Furthermore, there are 128 integer divisions in the A/D converter for the 20 volt range on which the signals from the strain gauges are analyzed such that each integer value is equivalent to 3500 pounds. Therefore, the weight, as measured by a particular strain gauge, may be calculated by the following equation:

$$Weight = (peak - baseline) \times (3500 \ pounds) \qquad (1)$$

Figure 6:
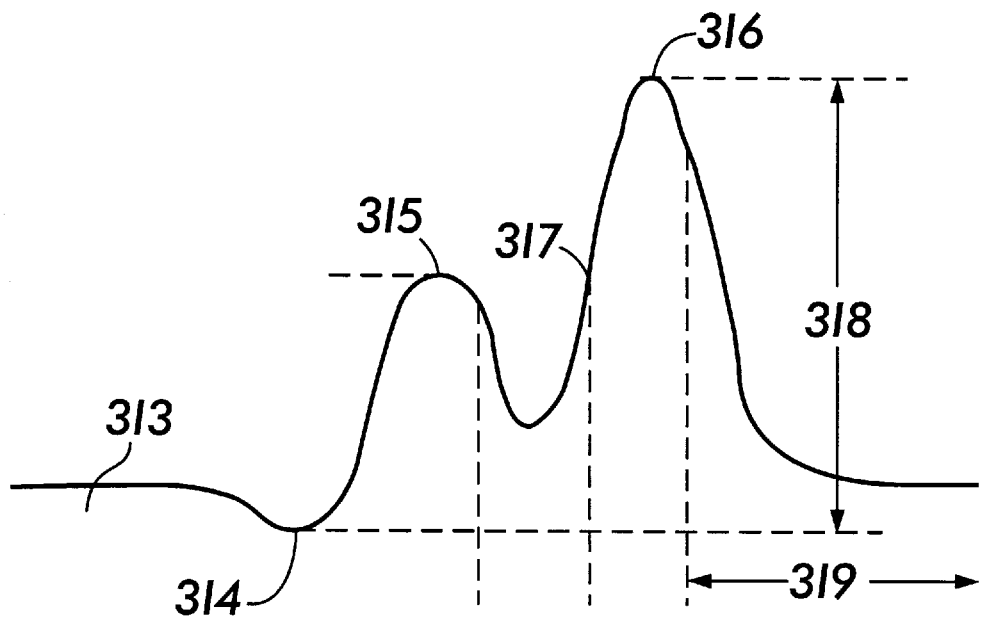

Referring now to FIG. 6, the debounce effect on a strain gauge signal is shown. As discussed briefly above, debounce occurs when a strain gauge signal reaches a peak voltage which is not the result of the direct overhead force of a railcar. Debounce may result from vibrations in the rail caused by the approach of a moving railcar, among other forces. Generally, a debounce effect is more likely with a heavy or extra heavy railcar, but it is possible with lighter railcars as well. As shown in FIG. 6, the waveform initially appears to be identical to the waveform in FIG. 5. However, during the debounce time 310 in FIG. 5, a new, larger peak is attained by the strain gauge signal. As discussed above, in this case, the previous peak was most likely the result of debounce effects and the subsequent, higher peak is the result of the direct weight of the railcar axle on the particular strain gauge. The systems and methods of the present invention, as applied to the waveform in FIG. 6, operate the same as described above for FIG. 5. First, the waveform is analyzed to determine a baseline voltage level. In FIG. 6, the baseline voltage level of the signal 313 is continuously updated until the minimum valve 314 is received.

The minimum value becomes the baseline voltage level. Again, a voltage rise greater than the predetermined amount (preferably 12,000 lbs/40 msec.) is detected and the systems and methods then monitor the signal for a peak voltage value. The peak 315 is next detected and the signal falls the predetermined amount (12,000 lbs less than the peak). The debounce mode is then entered and continues until a signal value greater than the peak 317 is detected or for a predetermined period of time. If, as shown in FIG. 6, the signal reaches a value greater than the peak, the systems and methods revert to the previous state in which the signal is monitored for a new peak voltage value. The actual peak 316 is detected and the predetermined fall is found again. Finally, the debounce state 319 is re-entered, and the signal does not again rise above the peak voltage value 316 during the debounce period 319. Thus, when the debounce time expires, the baseline voltage level 314 and differential voltage 318 (the peak voltage value 316 minus the baseline voltage level 314) are transmitted to the second processor. The second processor then determines the weight of the railcar axle, as measured by the strain gauge emitting the signal shown in FIG. 6, by multiplying the voltage differential 318 by the predefined weight to voltage ratio (3500 pounds per integer) to derive the weight reading of the strain gauge being analyzed.

Figure 7:
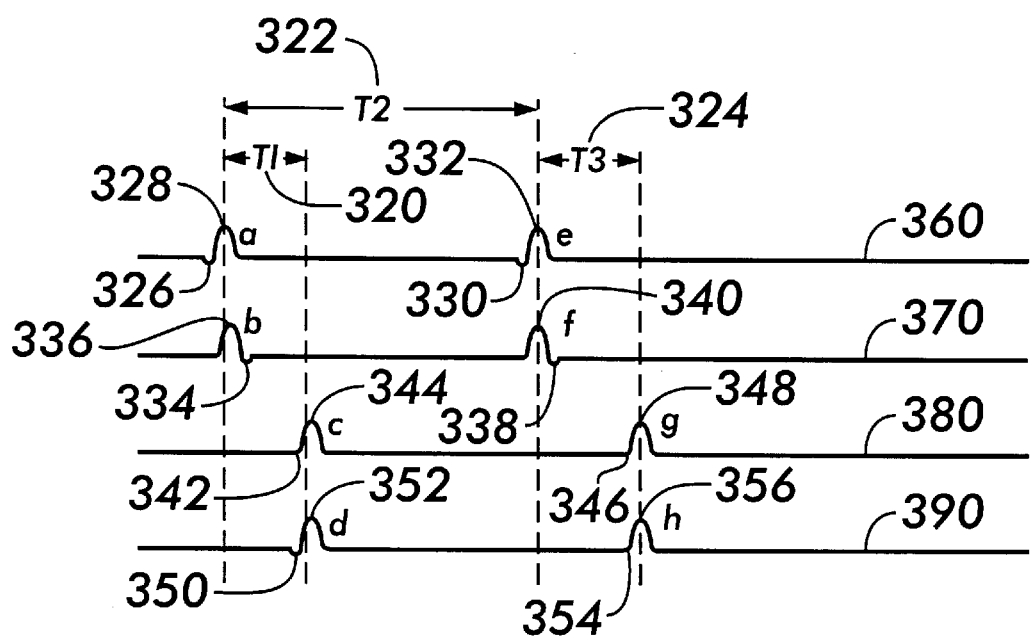
FIG. 7 shows the wave representations of the analog voltage signals resulting from a railcar passing over four strain gauges embedded into a portion of track in accordance with a preferred embodiment of the present invention.

As further examples, FIG. 7 shows four typical waveforms obtained from four strain gauges embedded into a section of railroad track in accordance with the present invention. Each waveform represents the reading from a particular one of the strain gauges. For example, the waveform 360 was obtained from strain gauge 12; waveform 370, from strain gauge 14; waveform 380, from strain gauge 16; and waveform 390, from strain gauge 18. By comparison of these waveforms 360, 370, 380, 390, it is apparent that the peak values from the first axle are almost simultaneously obtained for strain gauges 12 and 14. Similarly, the peaks resulting from the first axle passing over the strain gauges 16 and 18 are also basically simultaneous. As discussed above, the two strain gauges on either rail are spaced a particular distance apart, preferably two feet apart. Therefore, the system is able to obtain information related to the speed of the moving railcar. Since the distance between the strain gauges 12 and 16 is known, as well as the distance between strain gauges 14 and 18, the time 320 between the peak readings from these strain gauges, T1, can be used to determine the railcar's speed:

$$Speed = (2)/(T1) \ (units = ft/sec) \qquad (2)$$

The speed determination can similarly be performed with the waveforms resulting from the second axle of the railcar exerting force on the embedded strain gauges. In that case, again the strain gauges are the same known distance apart (2 feet) and the time 324 between the peak values received from strain gauges 12, 14 and strain gauges 16, 18 respectively is shown as T3. The formula for determining the speed is:

$$Speed = (2)/(T3) \ (units = ft/sec) \qquad (3)$$

The time 322 between the first axle and the second axle passing over the strain gauges 12, 14, shown on FIG. 7 as T2, corresponds to the distance between the axles on a given railcar. Since the axles on a railcar are usually five to six feet apart, and the distance between two strain gauges on the same rail is two feet, the time T2 is about three times greater than the time T1 necessary for the first axle of the moving railcar to travel two feet. The effect of acceleration of the railcar traveling down the hump track may, however, vary the value of T2.

Further evidenced by FIG. 7 are the variations in the baseline voltage level. Each peak and baseline value to be used in determining the weight reading of the individual strain gauge is indicated on the corresponding graph. For example, for strain gauge 12, waveform 360 shows the baseline value 326 accompanying the peak 328 for the first axle of the railcar, and the baseline value 330 accompanying the peak 332 for the second axle of the same railcar. Likewise, the baseline values 334, 338 and peaks 336, 340 for the first and second axles, respectively, of the moving railcar as read by strain gauge 14 are shown in waveform 370. As shown by these waveforms 360, 370, 380, 390, the baseline value for use with a given peak may precede the peak or follow it. Therefore, the system and method must continue to evaluate the baseline voltage level after the peak voltage level is obtained in order to assure that the lowest voltage value is used as the baseline in determining the weight.

With these general principles regarding the waveforms generated by the embedded strain gauges 12, 14, 16, 18 upon exertion of a force by a moving railcar on the strain gauges, a preferred method of the present invention will be described. Referring now to the high-level flowchart of FIG. 8, the algorithm implemented in the slave CPU 36 for dynamically determining the baseline voltage level and the peak voltage value of the signal emitted by each embedded strain gauge for every "hit" of an axle of a moving railcar is shown. As discussed above, the present invention performs wave analysis on the voltage from the strain gauges without the need for a known reference voltage. Therefore, the strain gauges may be placed anywhere on the rail. Variations in the speed of moving railcars do not result in errors or change the results of the weight analysis as it does in a block sampling system.

At the beginning of the process 500, the system is initialized 501 and the state for each strain gauge 12, 14, 16, 18 is set to zero. The A/D converters do not perform any conversions on the strain gauge signals until they receive a signal from the 1 millisecond clock (46 in FIG. 1). Upon receiving the signal at step 502, the A/D converters convert the signals from all of the strain gauges to corresponding digital values, and makes those signals available to the slave CPU. In addition, the slave CPU 36 enters a loop to read the values from each of the A/D converters and, thus, each of the embedded strain gauges. Therefore, at step 504, the strain gauge value is set to one, indicating that the voltage value of the first strain gauge 12 will be analyzed. Then, at step 506, the value from the A/D converter corresponding to strain gauge 12 will be read. At that point, step 508, the slave CPU will jump to the present state for the strain gauge being analyzed. The slave CPU's function in each state will be described more fully below. In general, depending on the state for the particular strain gauge, the slave CPU will perform a number of calculations. Then, the process loops. At step 518, the slave CPU determines if the strain gauge value equals the total number of embedded stain gauges, which is four in one preferred embodiment. If not, that indicates that other strain gauges must still be analyzed. Thus, at step 520, the strain gauge value is incremented by one and the next strain gauge, for example strain gauge 14, will be similarly analyzed. The voltage level will be read by the slave CPU from the corresponding A/D converter and the signal analyzed based on the present state of that strain gauge. After all four strain gauge values have been received from the respective A/D converters, the slave CPU again waits for a tick of the 1 millisecond clock to retrieve the new strain gauge values obtained by the A/D converters. This loop continues indefinitely with the function of the slave CPU being mandated by the present state of each strain gauge. Preferably, the slave CPU can perform the necessary calculations for all the embedded strain gauges within 1 millisecond so that strain gauge values obtained by the A/D converters are not lost during the slave CPU processing.

A more detailed description of the slave CPU's function in each state follows. Again assuming that the system has just been initialized so the state is set to 0 for each of the strain gauges and the strain gauge to be analyzed has been set to 1, indicating strain gauge 12, in step 504. During initialization of the system, in addition to setting the state to 0 for each strain gauge, in one preferred embodiment, the peak value is set to 0 and the baseline is set to the maximum voltage value obtainable from the strain gauge (e.g., 10 volts). This ensures that the voltage levels read from the strain gauges will automatically adjust the peak and baseline voltage levels during the first loop through the slave CPU process.

Then, at step 506, the slave CPU reads the value from the A/D converter for the strain gauge being analyzed, here strain gauge 12. Next, at step 508, the slave CPU jumps to the present state for the strain gauge 12. Immediately following initialization of the system, the state for each of the strain gauges is 0; however, after the system begins evaluating the strain gauge signals, the states for the various strain gauges may be different. For example, referring back to FIG. 7, strain gauges 12 and 14 could be in state 1 while strain gauges 16 and 18 remain in state 0, since the strain gauges 16 and 18 are two feet farther down on the hump track and will experience the effects of a moving railcar some time after the strain gauges 12 and 14 do. If the present state of the slave CPU's algorithm is 0 for the strain gauge being analyzed, the slave CPU will monitor the baseline level of the strain gauge signal at step 510. The slave CPU will continuously update the present baseline value (present_base) to reflect the lowest voltage level transmitted by the particular strain gauge (if new_sample<present_base then present_base=new_sample). In state 0, the slave CPU also continually monitors for a rise time above a predetermined amount, as discussed above. Again, in a preferred embodiment of the present invention, the rise time chosen for this purpose is 12,000 pounds in 40 milliseconds. Therefore, when the slave CPU is in state 0 monitoring a signal from a particular strain gauge, and the signal shows a rise time of over 12,000 pounds in a 40 millisecond period, then the state for the slave CPU algorithm for that strain gauge is changed to state 1. Thus, step 510 performs the dynamic baseline voltage level determination of the present invention and detects the onset of a peak.

In one preferred embodiment, the rise time detection of state 0 actually performs a dual function. If a rise in the baseline is detected which is less than the rise time chosen to indicate that a peak is likely to occur, but is still a significant deviation from the current baseline value (for example, a 6,000 pound rise in a 40 millisecond period), the baseline value is adjusted to indicate the new higher baseline value. This ensures that the baseline value which is compared with the peak in performing the weight determination is substantially accurate at the period of time when the peak is actually detected. For example, variations in temperature can result in the baseline level of a strain gauge rising significantly during the day. If the baseline level was never adjusted upward, the minimum baseline value returned from a strain gauge could have resulted from a deviation or could have been the result of variations in temperature causing different stresses on the strain gauge much earlier in the day. Such a baseline value would result in inaccuate weight determinations. Furthermore, since the baseline value is reset whenever a voltage signal lower than the present baseline value is received from the strain gauge, even an improper upward adjustment of the baseline, resulting from a short term rise, will be rectified as soon as the strain gauge voltage falls again.

Figure 8A:
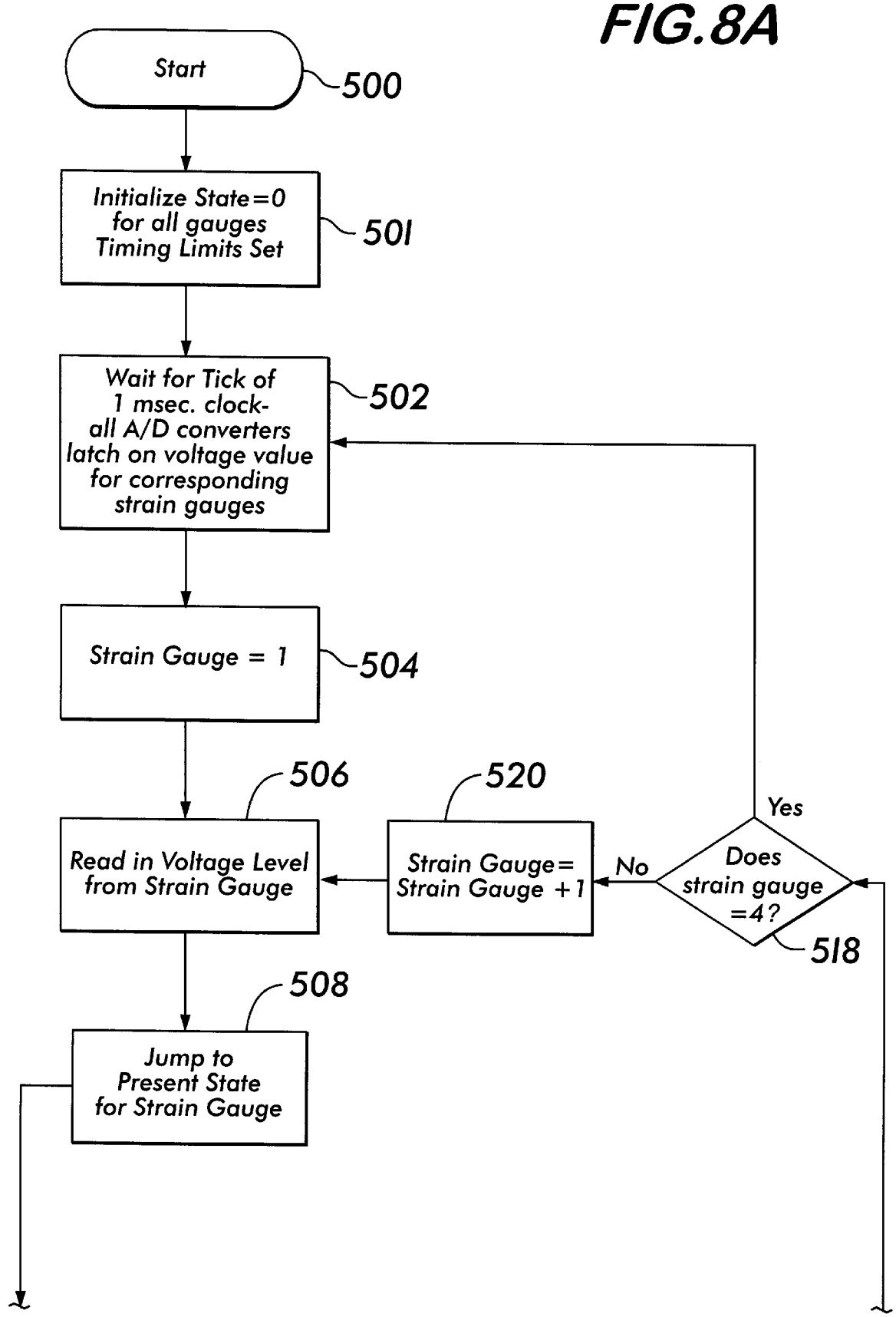
FIGS. 8–8B are a high level flowchart demonstrating the steps of the method performed by the first processor, or slave CPU, of a preferred embodiment of the present invention.
Figure 8B:
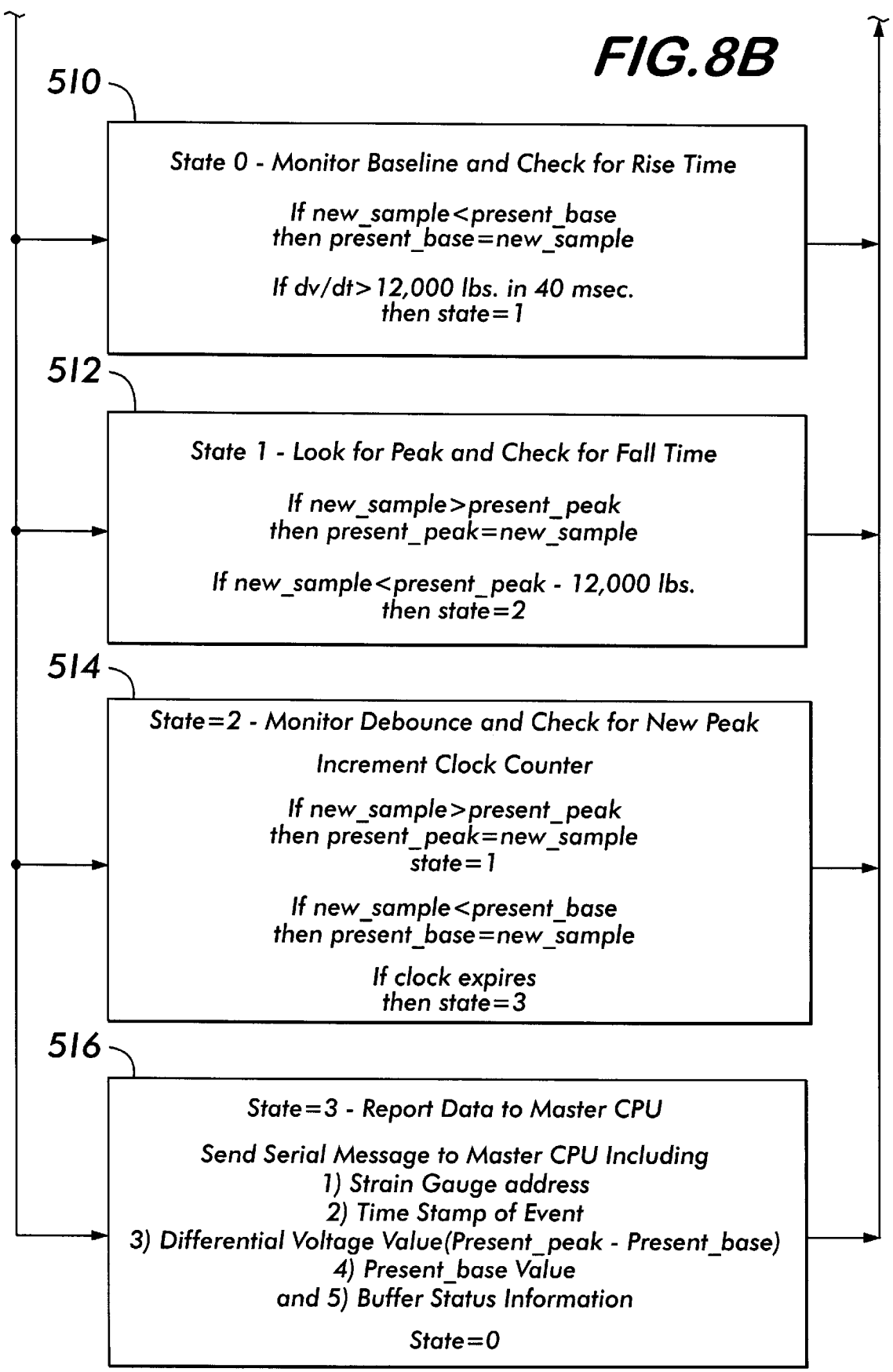

Returning again to the flowchart of FIG. 8, once the slave CPU is in state 1 for a particular strain gauge, the slave CPU has detected a rise time indicative of an upcoming peak, or hit. Therefore, while in state 1, the slave CPU continues to monitor the signal from the strain gauge and continuously updates the present peak value with the maximum voltage level attained by the strain gauge signal (if new_sample>present_peak then present_peak=new_sample). Thus, the peak value for each strain gauge is dynamically adjusted to reflect the maximum voltage level of the signal from that strain gauge. As the slave CPU is dynamically updating the peak voltage level, it is also monitoring the signal for a fall off. In a preferred embodiment of the present invention, the slave CPU is instructed to switch to state 2 once the voltage level of the signal from the strain gauge being monitored falls more than 12,000 pounds below the peak voltage level attained (if new_sample<present_peak−12,000 pounds then state=2).

In state 2, at step 514, the slave CPU monitors the signal from the strain gauge for "debounce" effects. Debounce, as discussed above, is the indirect effects that a railcar's movement may have on the strain gauge readings. Similar to an earthquake's aftershock, the magnitude of the force of the railcar on the rails may stress the strain gauges even when the railcar is not directly above the strain gauges and exerting the full force of its weight on the strain gauges. These indirect effects may cause the strain gauge signal to fluctuate greatly, resulting in a false peak either before or after the actual peak caused by the direct force of the railcar on the strain gauge. These fluctuations are referred to as the "debounce" caused by the moving railcar.

While in state 1, the slave CPU monitors the signal from the strain gauge and determines the "present_peak" value attained by the signal. This value is not necessarily the true peak value of the strain gauge resulting from a given railcar. Since the debounce effects can occur either before or after an actual peak, the slave CPU, in state 2, or the debounce mode, must continue to monitor the signal from the strain gauge to determine if a greater voltage is reached. If so, then the previous peak detected by the slave CPU was not actually the result of the moving railcar, but was probably the result of debounce effects. Therefore, the peak value must be updated to indicate the new, higher voltage (if new_sample>present_peak then present_peak=new_sample and state=1). The slave CPU returns to state 1 so that it can again monitor the strain gauge's signal for a new peak voltage level. During the debounce mode, state 2, the signal is also monitored to determine if the baseline voltage level should be adjusted. In order to obtain accurate weight measurements, the lowest baseline value received from the strain gauge in the time period surrounding the peak should be utilized. Therefore, if the signal's voltage drops below the previous baseline value, then the baseline is changed to reflect the new lower value (if new_sample<present_base then present_base=new_sample).

Once the debounce mode, state 2, is entered, the signal is continuously monitored for new peak or baseline values. However, the debounce effects are only likely within a short period of time surrounding the time that the railcar actually passes over the strain gauge. Furthermore, the system and method of the present invention must be prepared to analyze the strain gauge signal when the next axle of the moving railcar approaches the same strain gauge shortly after the first axle is detected. Therefore, the time in which the slave CPU remains in the debounce mode, or state 2, must be limited. Therefore, when state 2 commences, a clock counter is set for a predetermined time period. The debounce mode will only continue for that predetermined time period, which in one preferred embodiment of the present invention is about 250 milliseconds. If a new peak is not detected and the clock counter expires, the slave CPU is transferred to state 3, indicating that the present peak and baseline values are valid and the relevant data should be transmitted as a single strain gauge weight reading for further processing by the master CPU.

The master CPU is continually polling the slave CPU for data. The majority of the time, the slave CPU will have no data to report (while it is looping in states 0, 1 or 2 for all of the strain gauges). However, at step 516, state 3, the slave CPU has detected a valid weight reading by one of the strain gauges and should report the relevant data to the master CPU. The data that is transmitted to the master CPU includes the address number of the strain gauge for which the data was collected, the time stamp indicating when the peak was detected, the differential voltage value (determined by subtracting the baseline value from the peak), the present baseline value and buffer status information. This data is preferably transmitted via a data bus (48, in FIG. 1). However, many other ways of transmitting data may be used as will be apparent to those skilled in the art. The master CPU then collects this into usable weight readings and performs statistical analysis, as will be discussed below in connection with FIG. 9. Finally, once the slave CPU has reported the valid data for a specific strain gauge, the slave CPU reinitializes the strain gauge. Thus, the state is returned to 0 for that particular strain gauge so that it will be prepared to collect the necessary data for the next railcar axle reading. In addition, the baseline value will again be set to the maximum voltage and the peak will be reset to 0.

Referring now to the flowchart of FIG. 9, the algorithm implemented by the master CPU in one preferred embodiment of the present invention is shown. As discussed above, the master CPU is constantly polling the slave CPU requesting that it transmit any data which it has collected. The master CPU algorithm starts at step 700 and sets the axle value to 0 at step 702. This indicates that no data regarding a moving railcar has been transmitted to the master CPU by the slave CPU. Thus, at step 704, the master determines that it has not received the necessary data for all the axles of a moving railcar. Typically, railcars have two axles, however some heavier railcars may have three. Thus, the number of axles searched for in step 704 may vary depending on the railcar to be classified. Proceeding to step 706, the master CPU continues to poll the slave CPU for data. At step 706, the master CPU receives the relevant data from the slave CPU regarding the first two strain gauges which are stressed by the first axle of the moving railcar. The master CPU records the relevant data regarding these strain gauges at step 706.

In practice, the master CPU receives information for only one strain gauge at a time. However, as discussed above, if all strain gauges are operating properly, strain gauges 12 and 14 will experience a hit, or peak, almost simultaneously. Therefore, in actual operation, the master CPU receives a reading from a first strain gauge. Then, a short timer (not shown) is set by the master CPU to indicate the length of time in which a second strain gauge reading is expected from the slave CPU. The second strain gauge data may be reported within 1 millisecond if both strain gauges reach state 3during the same inner loop of the slave CPU process, as described above in connection with FIG. 8. However, the master CPU's short timer is preferably set for around 20 milliseconds to ensure that a valid reading from the second strain gauge is not missed. If the short timer expires and a second strain gauge reading has not been received, the master CPU assumes that the second strain gauge has malfunctioned and it will not be considered when averaging the valid weight readings. However, the master CPU will also continue to assess the validity of the first weight reading received. In one preferred embodiment, the master CPU must receive at least two weight readings for a railcar before it accepts that a railcar has in fact caused the data transmission. This ensures that a extraneous event is not reported as a railcar weight. The fault tolerance performed by the master CPU will be described in more detail below.

Since the data being transmitted includes the identity of the strain gauge from which the values were obtained, it is irrelevant whether strain gauge 12 or strain gauge 14 is received by the master CPU first. In either case, the master CPU will calculate the weight reading and attribute it to the appropriate strain gauge.

Next, after receiving readings from both strain gauges 12 and 14 or after the expiration of the short timer, the master CPU sets a two-foot timer, at step 708, in order to obtain the necessary time information to calculate the speed of the moving railcar. While a time stamp is sent by the slave CPU indicating the time the peak was reached by a strain gauge and, thus, the time that an axle passed directly over the strain gauge, the master CPU's two foot timer allows the master CPU to verify the time difference. The two foot timer can also be used as a means for allowing the master CPU to continue the process even if no other strain gauge signals are transmitted. A maximum time for the axle of the railcar to move two feet may be used as a limit for the two foot timer. In one embodiment, the two foot timer is set for 1 second, which is based on a railcar moving only 1.5 miles per hour. If that time has passed and no other strain gauge values have been transmitted from the slave CPU, the master CPU will either assume that the strain gauges did not operate properly and will perform the weight averaging without these values if readings were obtained from both of the first two strain gauges; otherwise, if only one strain gauge reading was obtained for the first axle, the master CPU will perform additional fault tolerance routines described in more detail below.

After receiving data from the first two strain gauges 12 and 14, at step 710, the master CPU receives, from the slave CPU, data regarding the same axle of the moving railcar received from the other two strain gauges 16 and 18 which are embedded two feet from the first two strain gauges 12 and 14. Again, the master CPU records this data. As discussed above, the master CPU actually receives one strain 35 gauge reading at a time and sets a short timer. If the short timer expires before the other strain gauge reading is received, the master CPU assumes that the other strain gauge is malfunctioning. Whether the master CPU receives a reading from strain gauge 16 or 18 first is irrelevant. Furthermore, even if neither reading is received, the method can continue with only a slight loss in accuracy. At step 712, the master CPU stops the two-foot timer and records the two-foot time, at step 714. At this point, the data collected by all the functioning strain gauges relating to a first axle of a moving railcar has been collected by the master CPU. Therefore, the algorithm updates the axle counter by one, at step 716, so that the number of axles now reads one.

Based on the valid strain gauge readings for the first axle, the master CPU calculates the weight transmitted by each strain gauge according to the peak voltage level and baseline voltage level for that strain gauge at step 718. It next calculates the average weight of that axle by averaging the weights received from each of the operable strain gauges at step 720. It also performs housekeeping functions, such as marking the strain gauge with the highest, step 722, and the lowest, step 724, weight readings and updating the high and low statistics for each of the four strain gauges, step 726. Finally, the master CPU writes the individual strain gauge weight readings, the average weight reading and the strain gauge statistics to the display, steps 728, 730, 732.

The algorithm employed by the master CPU then returns to the point where it determines if weight readings for all of the axles of a given moving railcar have been received by the master CPU. If they have not, the polling begins again and all of the preceding steps are repeating with the subsequent data transmitted by the slave CPU. The axle counter is incremented until the master CPU has received data for every axle of the moving railcar. Again, as discussed above, most railcars possess two axles; however, three axles are sometimes used for heavier railcars, such as engines. When the master CPU has received data on all of the axles of a moving railcar and the axle counter thus reads the correct number of axles, the method of the master CPU provides that the average weight calculated for each axle of the moving railcar be added together to determine the total weight of the railcar, step 734. The weight class (light, medium, heavy, extra heavy) of the railcar is next determined at step 736. This information is then transmitted to the display at step 738 and through the Input/Output Device at step 740 for use in the retarder control system where the data will be utilized to determine the need for and duration of operation of the retarders, as discussed above. Once this information is transmitted, the axle counter is returned to 0, at step 702, and the algorithm continues indefinitely, for each subsequent railcar.

As discussed briefly above, the master CPU is also capable of providing fault tolerance. For example, if one or even two of the strain gauges does not provide a reading for an axle of the moving railcar, the axle weight will be calculated based on the valid weight readings transmitted by the slave CPU to the master CPU. However, in one preferred embodiment, the system and method require that at least two strain gauges report a weight reading in order for the axle weight to be reported. This prevents extraneous events or surges experienced by one of the strain gauges from being reported by the master CPU as a railcar weight. However, it is also preferable that the system and method do not fail to report an actual railcar weight.

To provide fault tolerance, the master CPU in one preferred embodiment utilizes the short timer, the two foot timer and a long timer. The operation of the short timer and the two foot timer is described above. The long timer is utilized only when the master CPU has received only one weight reading from all of the embedded strain gauges for a first axle. Once the short timer and the long timer expire without the slave CPU transmitting another weight reading, the master CPU sets a long timer and waits for another weight reading for the same railcar. The long timer is preferably about 5 seconds, which is based on the time required for the second axle of the same railcar to travel the distance to the strain gauges. If another weight reading is received before the long timer expires, this second weight reading validates the first and indicates that a railcar is in fact moving over the strain gauges. If, on the other hand, the long timer expires without the slave CPU transmitting another weight reading, only one weight reading was received for the entire railcar. Thus, the master CPU determines that the sole weight reading was probably an anomoly, resulting from a surge or some extraneous event. The system, therefore, ignores the reading and returns to step 702 of FIG. 9 and continue polling for valid data for a first axle. The fault tolerance of the master CPU, therefore, allows the system and method to operate properly with less than all of the strain gauges operating, but it also avoids reporting an event which was probably not the result of a moving railcar. In sum, the system will report a weight of the moving railcar only if it receives at least two readings from the strain gauges. The first reading which is transmitted from the slave CPU must, in other words, be validated by the master CPU receiving at least one other reading during the time in which a railcar would be on the portion of the track in which the strain gauges are embedded. As will be readily apparent to those skilled in the art, many other procedures for providing fault tolerance could be implemented in connection with the present invention.

While the invention has been described and illustrated with reference to specific embodiments, those skilled in the art will recognize that modification and variations may be made without departing from the principles of the invention as described hereinabove and set forth in the following claims.

What is claimed is:

1. A measuring system for determining properties associated with a moving railcar, the system comprising:
   at least one strain gage adapted for coupling to at least one of two parallel rails of a railroad track;
   an amplifier circuit for receiving and amplifying signals from the at least one strain gage, resulting in amplified signals; and
   a first processing means for processing the amplified signals and for
      (i) monitoring the amplified signals for a rate of voltage increase that is greater than a predetermined value that is indicative of the moving railcar passing directly over the at least one strain gage;
      (ii) determining a baseline voltage level from the amplified signals until the rate of voltage increase of the amplified signals exceeds the predetermined value; the baseline voltage level being equal to the minimum voltage of the amplified signals prior to the rate of voltage increase of the amplified signals exceeding the predetermined value;
      (iii) determining a peak voltage level of the amplified signals after the rate of voltage increase of the amplified signals exceeds the predetermined valve.

2. The system of claim 1 wherein there are four strain gauges adapted for coupling to at least one of two parallel rails of a railroad track.

3. The system of claim 2 wherein, when coupled, two of the four strain gauges are coupled to one of the parallel rails and the other two of the four strain gauges are coupled to the other of the parallel rails.

4. The system of claim 3 wherein the strain gauges, when coupled to the parallel rails, are positioned such that both wheels on a first axle of the moving railcar pass over strain gauges approximately simultaneously.

5. The system of claim 4 further comprising a converter circuit for receiving the amplified signal and for converting the amplified signal to a digital signal for processing by the first processing means.

6. The system of claim 5, further comprising:
   a noise reduction circuit associated with the amplifier circuit for reducing noise associated with each of the four strain gages; and
   a surge protection circuit for protecting the converter circuit and the first processing means from voltage surges.

7. The system of claim 1, further comprising:
   a second processing means for receiving the baseline voltage level and a differential voltage equal to the difference between the peak voltage level and the baseline voltage level from the first processing means and for determining a weight reading by multiplying the differential voltage by a constant that equates voltage to weight.

8. The system of claim 7, further comprising a display means for displaying the weight reading determined by the second processing means.

9. The system of claim 7, further comprising a communication means for transmitting the weight reading of the moving railcar from the second processing means to an external terminal.

10. The system of claim 5, wherein the two strain gauges coupled to one of the parallel rails are a known distance apart and wherein the two strain gauges coupled to the other of the parallel rails are a known distance apart and wherein the system further comprises:
   a second processing means for
      (i) receiving the baseline voltage level and a differential voltage equal to the difference between the peak voltage level and the baseline voltage level from the first processing means for each strain gauge;
      (ii) determining a weight reading for each strain gauge by multiplying the differential voltage for the respective strain gauge by a constant that equates voltage to weight; and
      (iii) determining a time difference between receiving the peak voltage level from one of the strain gauges coupled to the one rail and the other of the strain gauges coupled to the same rail the time difference being indicative of a time required for an axle of the moving railcar to travel the known distance.

11. The system of claim 10 wherein the second processing means calculates a speed of the moving railcar by using the time difference and the known distance.

12. The system of claim 11 further comprising a controller means for transmitting signals representative of the speed and the weight of the moving railcar to retarder control mechanisms located on the track such that the speed and weight may be used to determine if braking or other railcar control must be initiated.

13. The system of claim 10, wherein the second processing means is for determining an average weight from the weight indicated by the peak voltage level of each of the strain gauges.

14. The system of claim 1, wherein the first processor is for determining debounce effects by determining if the rate of voltage increase of the amplified signals after the determination of the peak voltage level is greater than the predetermined value.

15. A method of determining dynamic properties of a moving railcar, the method comprising the steps of:

coupling at least one strain gauge to a section of railroad track;

amplifying a signal from the at least one strain gauge to produce an amplified signal;

monitoring the amplified signal for a rate of voltage increase that is greater than a predetermined value that is indicative of the moving railcar passing directly over the at least one strain gage;

determining a baseline voltage level from the amplified signal until the rate of voltage increase of the amplified signals exceeds the predetermined value; the baseline voltage level being equal to the minimum voltage of the amplified signal prior to the rate of voltage increase of the amplified signals exceeding a predetermined value; and determining a peak voltage level of the amplified signal after the rate of voltage increase of the amplified signals exceeds the predetermined valve.

16. The method of claim 15, further comprising the step of:

calculating a weight of the moving railcar according to each of the at least one strain gauges by determining a difference between the peak voltage level and the baseline voltage level and multiplying the difference by a predefined conversion factor.

17. The method of claim 15, and the method farther comprising the steps of: wherein the at least one strain gauge comprises at least four strain gauges coupling the at least four strain gauges in a section of railroad track comprising two parallel rails wherein two of the four strain gauges are coupled to one of the parallel rails a known distance apart and the other two of the four strain gauges are coupled to the other of the parallel rails the known distance apart;

recording a first time when the peak voltage level was transmitted by one of the four strain gauges;

recording a second time when the peak voltage level was transmitted by the other of the four strain gauges embedded in the same parallel rail as the one of the four strain gauges;

calculating a speed of the moving railcar by determining a difference between the first time and the second time and dividing the known distance by the difference.

18. A measuring system for determining properties associated with a moving railcar, the system comprising:

at least one strain gage adapted for coupling to at least one of two parallel rails of a railroad track;

an amplifier circuit for receiving and amplifying signals from the at least one strain gauge, resulting in amplified signals;

a first processing means for processing the amplified signals and for (i) monitoring the amplified signals for a rate of voltage increase that is greater than a predetermined value that is indicative of the moving railcar passing directly over the at least one strain gage;

(ii) determining a baseline voltage level from the amplified signals until the rate of voltage increase of the amplified signals exceeds the predetermined value; the baseline voltage level being equal to the minimum voltage of the amplified signals prior to the rate of voltage increase of the amplified signals exceeding a predetermined value;

(iii) determining a peak voltage level after the rate of voltage increase of the amplified signals exceeds the predetermined valve; and a second processing means for receiving the baseline voltage level and a differential voltage equal to the difference between the peak voltage level and the baseline voltage level from the first processing means and for determining a weight reading by multiplying the differential voltage by a constant that equates voltage to weight.

19. The system of claim 18, wherein the first processor is for determining debounce effects by determining if the rate of voltage increase of the amplified signals after the determination of the peak voltage level is greater than the predetermined value.

20. A measuring system for determining properties associated with a moving railcar, the system comprising:

at least two strain gauges adapted for coupling to at least one of two parallel rails of a railroad track, the at least two strain gauges being coupled to the at least one of the parallel rails at a known distance apart;

an amplifier circuit for receiving and amplifying signals from the at least two strain gauges, resulting in amplified signals;

a first processing means for processing the amplified signals and for (i) monitoring the amplified signals for each of the strain gauges for a rate of voltage increase that is greater than a predetermined value that is indicative of the moving railcar passing directly over the each of the strain gauges;

(ii) determining for each strain gauge a baseline voltage level from the amplified signals until the rate of voltage increase of the amplified signals exceeds the predetermined value; the baseline voltage level being equal to the minimum voltage of the amplified signals prior to the rate of voltage increase of the amplified signals exceeding a predetermined value;

(iii) determining for each strain gauge a peak voltage level after the rate of voltage increase of the amplified signals exceeds the predetermined valve;

a second processing means for (i) receiving the baseline voltage level and a differential voltage equal to the difference between the peak voltage level and the baseline voltage level for each strain gauge from the first processing means (ii) determining a weight reading by multiplying the differential voltage by a constant that equates voltage to weight for each strain gauge; and (iii) determining a time difference between receiving the peak voltage level from one of the strain gauges and the peak voltage level from the other of the strain gauges, the time difference being indicative of a time required for an axle of the moving railcar to travel the known distance.

21. The system of claim 20, wherein the second processor is for determining the speed of the railcar from the determined time difference.

22. A measuring system for determining properties associated with a moving railcar, the system comprising:

at least two strain gauges adapted for coupling to at least one of two parallel rails of a railroad track, the at least two strain gauges being coupled to the at least one of the parallel rails at a known distance apart;

an amplifier circuit for receiving and amplifying signals from the at least two strain gauges, resulting in amplified signals;

a first processing means for processing the amplified signals and for
  (i) monitoring the amplified signals for each of the strain gauges for a rate of voltage increase that is greater than a predetermined value that is indicative of the moving railcar passing directly over the each of the strain gauges;
  (ii) determining for each strain gauge a baseline voltage level from the amplified signals until the rate of voltage increase of the amplified signals exceeds the predetermined value; the baseline voltage level being equal to the minimum voltage of the amplified signals prior to the rate of voltage increase of the amplified signals exceeding a predetermined value;
  (iii) determining for each strain gauge a peak voltage level after the rate of voltage increase of the amplified signals exceeds the predetermined value;

a second processing means for
  (i) receiving the baseline voltage level and a differential voltage equal to the difference between the peak voltage level and the baseline voltage level for each strain gauge from the first processing means
  (ii) determining a weight reading by multiplying the differential voltage by a constant that equates voltage to weight for each strain gauge;
  (iii) determining a time difference between receiving the peak voltage level from one of the strain gauges and the peak voltage level from the other of the strain gauges, the time difference being indicative of a time required for an axle of the moving railcar to travel the known distance;
  (iv) determining a speed of the railcar from the determined time difference.

* * * * *

UNITED STATES PATENT AND TRADEMARK OFFICE
CERTIFICATE OF CORRECTION

PATENT NO. : 5,883,337

DATED : March 16, 1999

INVENTOR(S) : Dolan et al.

It is certified that error appears in the above-indentified patent and that said Letters Patent is hereby corrected as shown below:

Column 3, Line 8, delete "of the: strain" and insert --of the strain-- therefor.
Column 5, Line 11, delete "FIGS. 3A and 3B shows" and insert --FIGS. 3A and 3B show-- therefor.
Column 5, Line 36, delete "abovementioned" and insert --above-mentioned-- therefor.
Column 5, Line 53, delete "by.reference." and insert --by reference.-- therefor.
Column 6, Line 23, delete "shown in FIG. 3." and insert --shown in FIGS. 3A and 3B.-- therefor.
Column 7, Lines 59-60, delete "millisec-ond.may" and insert --millisecond may--therefor.
Column 9, Line 20, delete "point" and insert --point "d".-- therefor.
Column 10, Line 6, delete "gauges is operating" and insert --gauges are operating-- therefor.
Column 12, Line 6, delete "minimum valve 314" and insert --minimum value 314-- therefor.
Column 15, Line 9, delete "inaccuate weight" and insert --inaccurate weight-- therefor.
Column 17, Line 11, delete "3during" and insert --3 during --therefor.
Column 17, Line 24, delete "that a extraneous" and insert --than an extraneous-- therefor.
Column 17, Line 64, delete "35 gauge reading" and insert --gauge reading-- therefor.
Column 19, Line 16, delete "and continue polling" and insert --and continues polling-- therefor.

UNITED STATES PATENT AND TRADEMARK OFFICE
CERTIFICATE OF CORRECTION

PATENT NO. : 5,883,337
DATED : March 16, 1999
INVENTOR(S) : Dolan et al.

It is certified that error appears in the above-indentified patent and that said Letters Patent is hereby corrected as shown below:

```
Column 19, Lines 20 and 21, delete "In sum, the" and insert
--In summary, the-- therefor.
Column 19, Line 40, delete "gage" and insert --gauge-- therefor.
Column 19, Line 43, delete "gage," and insert --gauge,-- therefor.
Column 19, Line 50, delete "gage;" and insert --gauge;-- therefor.
Column 19, Line 60, delete "the predetermined valve." and insert
--the predetermined value.-- therefor.
Column 20, Line 12, delete "gages;" and insert --gauges;--
therefor.
Column 20, Line 47, delete "to the same rail" and insert
--to the same rail,-- therefor.
Column 21, Line 10, delete "gage;" and insert --gauge;-- therefor.
Column 21, Line 20, delete "valve." and insert --value.-- therefor.
Column 21, Line 29, delete "the method farther" and insert
-- the method further-- therefor.
Column 21, Line 50, delete "gage" and insert --gauge-- therefor.
Column 22, Line 3, delete "valve;" and insert --value;-- therefor.
Column 22, Line 41, delete "valve;" and insert --value;-- therefor.
```

Signed and Sealed this

Fifth Day of October, 1999

Attest:

Q. TODD DICKINSON

*Attesting Officer*   *Acting Commissioner of Patents and Trademarks*